United States Patent
Kim et al.

(10) Patent No.: US 11,363,528 B2
(45) Date of Patent: *Jun. 14, 2022

(54) METHOD AND APPARATUS FOR REDUCING SIGNALING OVERHEAD AND REDUCING BATTERY OF TERMINAL

(71) Applicant: Samsung Electronics Co., Ltd., Suwon-si (KR)

(72) Inventors: Soenghun Kim, Suwon-si (KR); Seungri Jin, Suwon-si (KR); Donggun Kim, Seoul (KR); Sangbum Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,648

(22) Filed: Sep. 9, 2019

(65) Prior Publication Data

US 2019/0394727 A1 Dec. 26, 2019

Related U.S. Application Data

(63) Continuation of application No. 15/416,734, filed on Jan. 26, 2017, now Pat. No. 10,412,674.
(Continued)

(51) Int. Cl.
*H04W 52/02* (2009.01)
*H04W 24/02* (2009.01)
(Continued)

(52) U.S. Cl.
CPC ....... *H04W 52/0225* (2013.01); *H04W 24/02* (2013.01); *H04W 88/02* (2013.01); *H04W 88/08* (2013.01); *Y02D 30/70* (2020.08)

(58) Field of Classification Search
CPC . H04W 52/0225; H04W 24/02; H04W 88/08; Y02D 70/1262; Y02D 70/23; Y02D 70/21
See application file for complete search history.

(56) References Cited

U.S. PATENT DOCUMENTS 7,948,921 B1 5/2011 Hughes et al.
8,171,120 B1 5/2012 Muhanna et al.
(Continued)

FOREIGN PATENT DOCUMENTS

CN 101427489 A 5/2009
CN 102595386 A 7/2012
(Continued)

OTHER PUBLICATIONS

Extended European Search Report dated Oct. 17, 2018, issued in a counterpart European application No. 17744600.2-1219/3378249.
(Continued)

*Primary Examiner* — Rasheed Gidado
(74) *Attorney, Agent, or Firm* — Jefferson IP Law, LLP

(57) ABSTRACT

A communication method of a terminal for saving a battery of a terminal and reducing a signaling overhead when small data are processed is provided. The communication method includes receiving, from a base station, a first message including at least one of first information indicating whether a first signaling optimization is allowed for the terminal, or second information indicating whether a second signaling optimization is allowed for the terminal, transmitting, to the base station, a second message including at least one of third information indicating whether the first signaling optimization is supported by the terminal, or fourth information indicating whether the second signaling optimization is supported by the terminal, and receiving, from the base station, a third message including fifth information indicating a signaling optimization supported for the terminal.

18 Claims, 17 Drawing Sheets

Related U.S. Application Data

(60) Provisional application No. 62/287,661, filed on Jan. 27, 2016.

(51) Int. Cl.
*H04W 88/08* (2009.01)
*H04W 88/02* (2009.01)

(56) References Cited

U.S. PATENT DOCUMENTS

| | | | |
|---|---|---|---|
| 8,774,129 | B2 | 7/2014 | De Benedittis et al. |
| 9,706,434 | B2* | 7/2017 | Wu .................. H04W 28/0289 |
| 9,854,523 | B2 | 12/2017 | Landais et al. |
| 10,045,333 | B2* | 8/2018 | Hahn .................... H04W 24/10 |
| 2007/0287476 | A1 | 12/2007 | Jeong et al. |
| 2009/0247176 | A1 | 10/2009 | Song et al. |
| 2009/0257353 | A1 | 10/2009 | Song et al. |
| 2012/0164952 | A1 | 6/2012 | Lee et al. |
| 2012/0172063 | A1* | 7/2012 | Lee ..................... H04W 74/006 455/458 |
| 2012/0177005 | A1 | 7/2012 | Liang et al. |
| 2012/0276913 | A1 | 11/2012 | Lim et al. |
| 2012/0282956 | A1* | 11/2012 | Kim ........................ H04W 4/70 455/466 |
| 2012/0294157 | A1 | 11/2012 | Guo et al. |
| 2013/0260740 | A1 | 10/2013 | Rayavarapu |
| 2014/0016614 | A1* | 1/2014 | Velev ................. H04W 36/165 370/331 |
| 2014/0126489 | A1* | 5/2014 | Zakrzewski ...... H04W 72/1289 370/329 |
| 2014/0254451 | A1 | 9/2014 | Jamadagni et al. |
| 2014/0334371 | A1* | 11/2014 | Kim .................. H04W 36/0088 370/311 |
| 2015/0113128 | A1* | 4/2015 | Huang .................... H04L 47/16 709/224 |
| 2015/0189590 | A1 | 7/2015 | Hu et al. |
| 2015/0208450 | A1* | 7/2015 | Mademann ......... H04L 65/1006 370/329 |
| 2015/0236985 | A1 | 8/2015 | Chandramouli et al. |
| 2015/0271848 | A1* | 9/2015 | Gerasimenko ...... H04L 47/2433 370/338 |
| 2016/0007213 | A1 | 1/2016 | Cui et al. |
| 2016/0029417 | A1 | 1/2016 | Vannithamby et al. |
| 2016/0174135 | A1 | 6/2016 | Yan et al. |
| 2016/0248686 | A1 | 8/2016 | Lee et al. |
| 2017/0086062 | A1* | 3/2017 | Chen ..................... H04W 76/12 |
| 2017/0180981 | A1 | 6/2017 | Lin et al. |

FOREIGN PATENT DOCUMENTS

| | | |
|---|---|---|
| CN | 103581954 A | 2/2014 |
| CN | 103582154 A | 2/2014 |
| JP | 2015-029310 A | 2/2015 |
| KR | 10-2016-0137153 A | 11/2016 |
| WO | 2014/182338 A1 | 11/2014 |
| WO | 2015/013858 A1 | 2/2015 |

OTHER PUBLICATIONS

Chinese Office Action dated Nov. 2, 2020, issued in Chinese Application No. 201780008359.5.

Indian Office Action dated Apr. 1, 2021, issued in Indian Application No. 201837022829.

* cited by examiner

METHOD AND APPARATUS FOR REDUCING SIGNALING OVERHEAD AND REDUCING BATTERY OF TERMINAL

CROSS-REFERENCE TO RELATED APPLICATION(S)

This application is a continuation application of prior application Ser. No. 15/416,734, filed on Jan. 26, 2017, which has issued as U.S. Pat. No. 10,412,674 on Sep. 10, 2019 and was based on claimed priority under 35 U.S.C. § 119(e) of a U.S. Provisional application Ser. No. 62/287,661, filed on Jan. 27, 2016, in the U.S. Patent and Trademark Office, the disclosure of which is incorporated by reference herein in its entirety.

TECHNICAL FIELD

The present disclosure relates to a method and an apparatus for selecting and applying methods capable of saving a battery of a terminal and reducing a signaling overhead when small data are processed in a mobile communication system.

BACKGROUND

Since the commercialization of a $4^{th}$ generation (4G) communication system, a lot of research and development on a $5^{th}$ generation (5G) communication system has been conducted in order to deal with the recent increasing demand for wireless data traffic. For this reason, the 5G communication system or the pre-5G communication system is called a communication system beyond 4G network or a system since the post long term evolution (LTE).

To achieve a high data transmission rate, the 5G communication system is considered to be implemented in a super high frequency millimeter wave (mmWave) band (for example, like 60 GHz band). To relieve a path loss of a radio wave and increase a transfer distance of a radio wave in the super high frequency band, in the 5G communication system, beamforming, massive multiple input, multiple output (MIMO), full dimensional MIMO (FD-MIMO), array antenna, analog beam-forming, large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, in the 5G system, hybrid frequency shift keying (FSK) and quadrature amplitude modulation (QAM) (FQAM) and sliding window superposition coding (SWSC) which are an advanced coding modulation (ACM) scheme and a filter bank multi carrier (FBMC), a non-orthogonal multiple access (NOMA), and a sparse code multiple access (SCMA) which are an advanced access technology, or the like have been developed.

Meanwhile, as various packet services are commercialized, the existing human-centered wireless communication networks have evolved into the internet of things (IoT) network that transmits and receives information between components in which various things are distributed and processes the information. The internet of everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service by fusing and combining the existing information technology (IT) with various industries.

Therefore, various tries to apply the 5G communication system to the IoT network have been conducted. For example, the 5G communication technologies such as the technologies of the sensor network, the M2M, the MTC are implemented by techniques such as the beam-forming, the MIMO, the array antenna, or the like. An example of the application of the cloud RAN as the big data processing technology described above may also be the fusing of the 5G technology with the IoT technology.

The 5G system has considered a support for various services compared to the existing 4G system. For example, the most representative services are an enhanced mobile broadband (eMBB) communication service, an ultra-reliable and low latency communication (URLLC) service, a massive MTC (mMTC) service, an evolved multimedia broadcast/multicast service (eMBMS), etc. Further, a system providing the URLLC service may be referred to as an URLLC system, a system providing the eMBB service may be referred to as an eMBB system, and a system providing the mMTC service may be referred to as an mMTC system, or the like. In addition, the terms "service and system" may be used interchangeably.

Meanwhile, if a huge number of IoT terminals are added to the existing wireless communication network, a serious load may be imposed on the network together with the existing terminals. Particularly, a case where the IoT terminals intermittently transmit small packets frequently occurs. In the typical mobile communication systems, a signaling connection and a data bearer need to be set in order to transmit a packet no matter how small the packet is. A large number of control message exchanges are involved during the process. When a connection configuration procedure is performed in order to transmit/receive small data, a serious load may not only be imposed on the network, but battery performance may also be reduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for selecting and applying methods for efficiently processing packets having a small size and intermittently generated to save a battery of a terminal and reduce a signaling overhead.

Another aspect of the present disclosure is to provide two methods for reducing a signaling overhead that may occur when a terminal intermittently transmits a small packet and reducing battery consumption of the terminal and proposes a method for efficiently selecting and applying the methods by negotiating the terminal with the base station, and a network. Further, a mode switching method for preventing an abuse of solution A that may occur when the small packet is continuously generated is provided.

Another aspect of the present disclosure is to provide a method and apparatus for selecting and applying solution A (technique for transmitting a small message through a signaling radio bearer (SRB)) or solution B (technique for retaining a radio resource control (RRC) context even in an idle mode to reduce a signaling overhead) that saves battery consumption of a terminal and reduces the signaling overhead by negotiating the terminal with a base station and a network mobility management entity (MME).

The base station broadcasts whether to support the solution A or solution B in a cell through system information and the terminal determines what solution is applied in a specific cell in consideration of 'solution supported in a current serving cell', 'solution that a terminal wants', 'solution agreed with use of MME', 'whether data radio bearer (DRB) is setup' or the like. Further, data are transmitted and received by applying the determined solution.

In accordance with an aspect of the present disclosure, a method of a terminal in a wireless communication system is provided. The method includes receiving, from a base station, a first message including at least one of first information indicating whether a first signaling optimization is allowed for the terminal, or second information indicating whether a second signaling optimization is allowed for the terminal, transmitting, to the base station, a second message including at least one of third information indicating whether the first signaling optimization is supported by the terminal, or fourth information indicating whether the second signaling optimization is supported by the terminal, and receiving, from the base station, a third message including fifth information indicating a signaling optimization supported for the terminal.

The first message may include a system information block (SIB).

The second message may further include sixth information on preferred signaling optimization of the terminal.

The second message may include a non-access stratum (NAS) message including at least one of the third information or the fourth information.

The method may further include retaining, if the signaling optimization supported for the terminal is the first signaling optimization, a terminal context at connection release, transmitting, to the base station, a fourth message requesting connection reuse, receiving, from the base station, a fifth message including at least one configuration information, and establishing a connection based on the terminal context and the at least one configuration information.

In accordance with another aspect of the present disclosure, a method of a base station in a wireless communication system is provided. The method includes transmitting, to a terminal, a first message including at least one of first information indicating whether a first signaling optimization is allowed for the terminal, or second information indication whether a second signaling optimization is allowed for the terminal, receiving, from the terminal, a second message including at least one of third information indicating whether the first signaling optimization is supported by the terminal, or fourth information indicating whether the second signaling optimization is supported by the terminal, and transmitting, to the terminal, a third message including fifth information indicating a signaling optimization supported for the terminal.

The method may further include selecting an MME based on the second message, and forwarding the second message to the MME, and receiving, from the MME, a fourth message including the fifth information indicating a signaling optimization supported for the terminal.

The method may further include transmitting, to the terminal, a fifth message requesting the terminal to retain a terminal context at connection release, if the signaling optimization supported for the terminal is the first signaling optimization, receiving, from the terminal, a sixth message requesting connection reuse, and transmitting, from the base station, a seventh message including at least one configuration information.

In accordance with another aspect of the present disclosure, a terminal is provided. The terminal includes a transceiver for transmitting and receiving a signal, and a controller for receiving, from a base station, a first message including at least one of first information indicating whether a first signaling optimization is allowed for the terminal, or second information indication whether a second signaling optimization is allowed for the terminal, for transmitting, to the base station, a second message including at least one of third information indicating whether the first signaling optimization is supported by the terminal, or fourth information indicating whether the second signaling optimization is supported by the terminal, and for receiving, from the base station, a third message including fifth information indicating a signaling optimization supported for the terminal.

In accordance with another aspect of the present disclosure, a base station is provided. The base station includes a transceiver for transmitting and receiving a signal, and a controller for transmitting, to a terminal, a first message including at least one of first information indicating whether a first signaling optimization is allowed for the terminal, or second information indication whether a second signaling optimization is allowed for the terminal, for receiving, from the terminal, a second message including at least one of third information indicating whether the first signaling optimization is supported by the terminal, or fourth information indicating whether the second signaling optimization is supported by the terminal, and for transmitting, to the terminal, a third message including fifth information indicating a signaling optimization supported for the terminal.

According to the embodiment of the present disclosure, the method and apparatus for selecting and applying the methods for efficiently processing packets having a small size and intermittently generated may be suggested to save the battery of the terminal and reduce the signaling overhead.

Further, according to the embodiment of the present disclosure, the solution negotiation procedure with the MME mobility management entity and the operation of determining a solution to be applied by the terminal may be suggested to reflect the solution preference and the support state of the terminal, the base station, and the MME. In addition, when many terminals perform the connection configuration procedure to transmit/receive small data, it is possible to reduce the signaling overhead caused by a large number of control message exchanges and improve the battery performance of the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
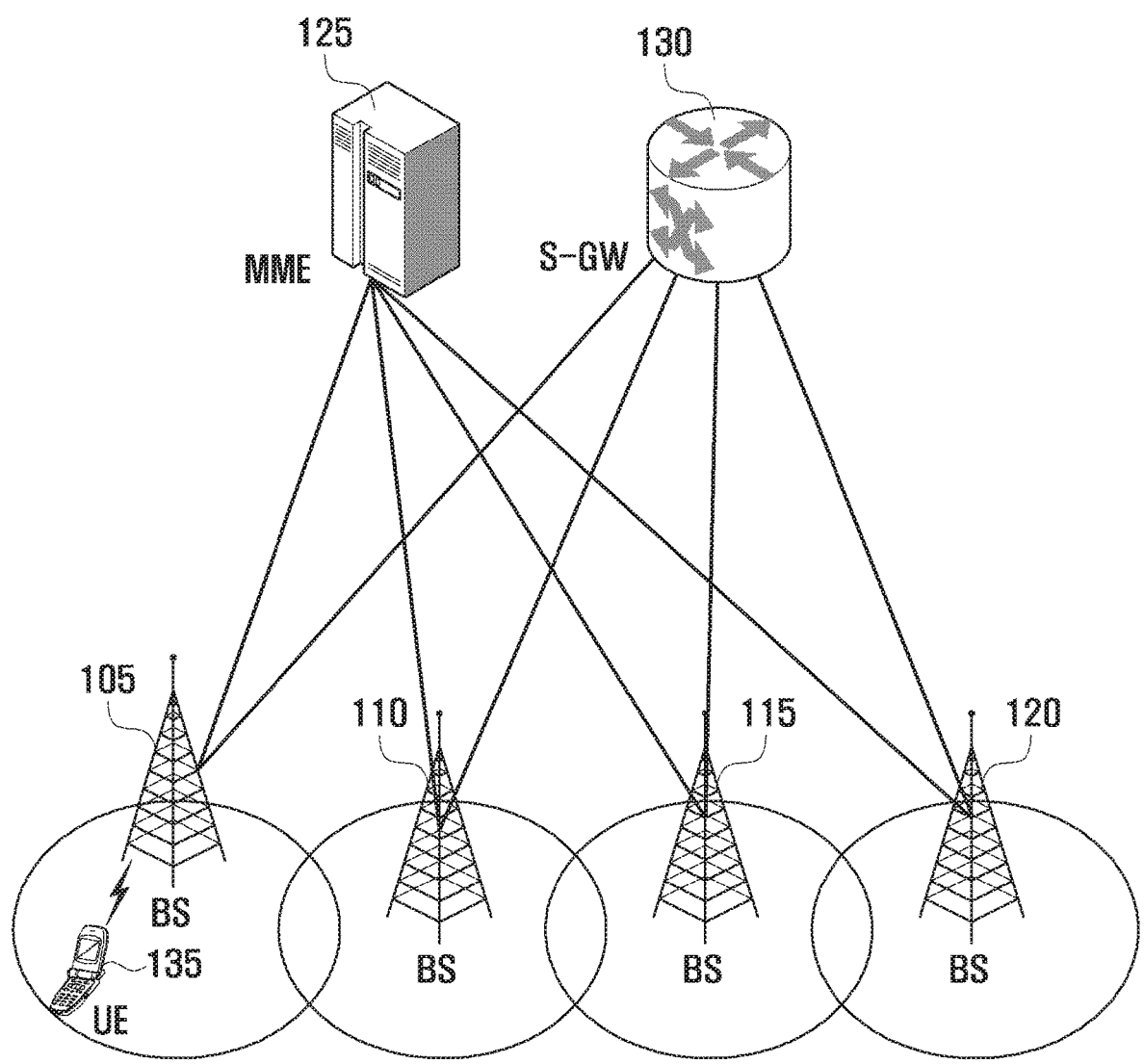
FIG. 1 is a diagram illustrating an example of a network structure of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in each block of the flow chart. Since these computer program instructions may also be stored in a non-transitory computer usable or computer readable memory of a computer or other programmable data processing apparatuses in order to implement the functions in a specific scheme, the computer program instructions stored in the non-transitory computer usable or computer readable memory may also produce manufacturing articles including instruction means performing the functions described in each block of the flow chart. Since the computer program instructions may also be mounted on the computer or the other programmable data processing apparatuses, the instructions performing a series of operations on the computer or the other programmable data processing apparatuses to create processes executed by the computer, thereby executing the computer or the other programmable data processing apparatuses may also provide operations for performing the functions described in each block of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously shown may be simultaneously performed in fact or be performed in a reverse sequence depending on corresponding functions sometimes.

Here, the term '~unit' used in the present embodiment means software or hardware components such as field-programmable gate array (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more central processing units (CPUs) within a device or a security multimedia card. Further, in an embodiment, 'unit' may include one or more processors.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

A base station (BS) which is a subject communicating with a terminal is referred to as a BS, a base transceiver station (BTS), a NodeB (NB), an evolved node B (eNB, eNodeB), an access point (AP), a fifth generation (5G) NB, or the like. In particular, a heterogeneous network including a main BS and an auxiliary BS is a main background of the present disclosure, in which the main BS may be referred to as a macro BS, a primary BS, a primary cell (PCell), etc. and the auxiliary BS may be referred to as a small BS, a secondary BS, secondary cell (SCell), etc.

User equipment (UE) which is one subject communicating with a BS may be referred to as a UE, a device, a mobile station (MS), mobile equipment (ME), a terminal, etc.

Hereafter, for convenience of explanation, the present disclosure uses terms and names defined in the 3rd generation partnership project long term evolution (3GPP LTE). However, the present disclosure is not limited to the terms and names but may also be identically applied to the system according to other standards.

The present disclosure relates to a method and apparatus for selecting and applying methods for efficiently processing packets having a small size and intermittently generated. Hereinafter, prior to describing the present disclosure, an LTE system and methods (e.g., solution A and solution B) for efficiently processing packets having a small size and intermittently generated will be briefly described.

FIG. 1 is a diagram illustrating an example of a network structure of a wireless communication system according to an embodiment of the present disclosure.

Referring to FIG. 1, a structure of the LTE system to which the present disclosure is applied is illustrated. The wireless communication system includes a plurality of BSs 105, 110, 115 and 120, a mobility management entity (MME) 125, a serving gateway (S-GW) 130, etc. UE (hereinafter, UE or terminal) 135 is connected to an external network through the BSs 105, 110, 115, and 120 and the S-GW 130.

The BSs 105, 110, 115, and 120 are access nodes of a cellular network and provide a wireless access to terminals that are connected to the network. That is, in order to serve traffic of users, the BSs 105, 110, 115, and 120 collect and schedule state information such as a buffer state, an available transmission power state, and a channel state of the UE 135 to support a connection between the UE 135 and a core network (CN). The MME 125 is an apparatus serving to perform various control functions as well as a mobility management function for the UE 135 and is connected to the plurality of BSs 105, 110, 115, and 120. Further, the S-GW 130 is an apparatus providing a data bearer. Further, the MME 125 and the S-GW 130 may further perform authentication, bearer management, etc., on the UE connected to the network and the BS 105, 110, 115 may process packets that are to be received from the BSs 105, 110, 115, and 120 and are to be transmitted to the BSs 105, 110, 115, and 120.

Figure 2:
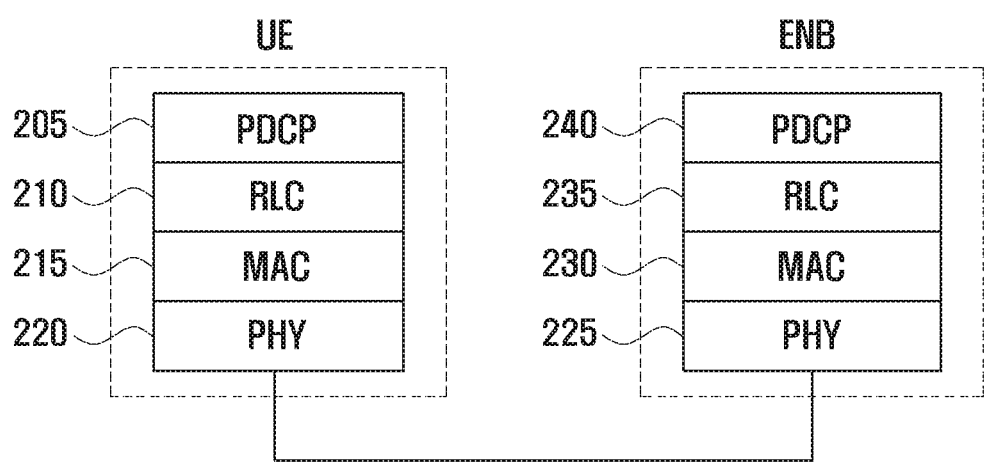
FIG. 2 is a diagram illustrating a radio protocol structure in a long term evolution (LTE) system according to an embodiment of the present disclosure.

FIG. 2 is a diagram illustrating a radio protocol structure in an LTE system according to an embodiment of the present disclosure.

Referring to FIG. 2, a radio protocol of an LTE system consists of various layers including a packet data convergence protocol (PDCP) layers 205 and 240, radio link control (RLC) layers 210 and 235, and medium access control (MAC) layers 215 and 230 in the UE and the BS (e.g., ENB), respectively.

The PDCP layers 205 and 240 perform operations such as an internet protocol (IP) header compression/recovery and the radio link controls 210 and 235 reconfigures a PDCP packet data unit (PDU) to an appropriate size. The media access control (MAC) layers 215 and 230 are connected to several RLC layer apparatuses configured in one UE and perform an operation of multiplexing RLC PDUs into an MAC PDU and demultiplexing the RLC PDUs from the MAC PDU.

Physical (PHY) layers 220 and 225 perform operations of channel-coding and modulating higher layer data and making them into an orthogonal frequency division multiplexing (OFDM) symbol and transmitting them to the radio channel or operations of demodulating and channel-decoding the OFDM symbol received through the radio channel and transmitting it to a higher layer. In addition, the physical layers 220 and 225 also use a hybrid automatic repeat request (HARQ) for additional error correction and a receiving end may transmit, in 1 bit, whether to receive packets transmitted from a transmitting end. This is called HARQ acknowledgement (ACK)/negative ACK (NACK) information. Downlink HARQ ACK/NACK information on an uplink transmission may be transmitted through a physical channel of a physical hybrid-ARQ indicator channel (PHICH) and uplink HARQ ACK/NACK information on a downlink transmission may be transmitted through a physical channel of a physical uplink control channel (PUCCH) or a physical uplink shared channel (PUSCH).

Figure 3:
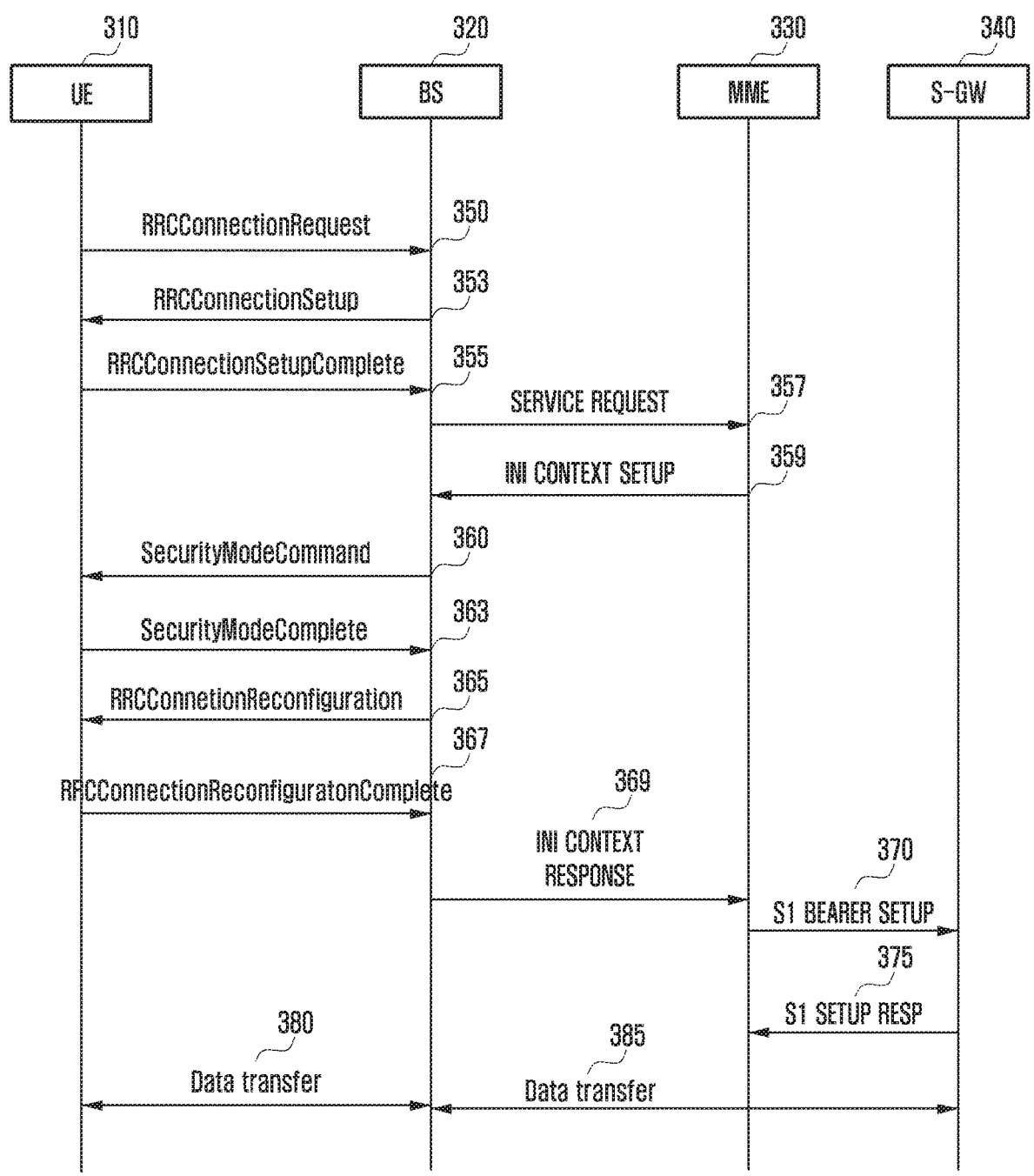
FIG. 3 is a diagram illustrating a normal procedure for setting up a connection with a network in order for a terminal to transmit and receive data according to an embodiment of the present disclosure.

FIG. 3 is a diagram illustrating a normal procedure for setting up a connection with a network in order for the UE to transmit and receive data according to an embodiment of the present disclosure.

Referring to FIG. 3, UE (hereinafter, idle mode UE) 310 that is not currently connected may perform a procedure of radio resource control (RRC) connection establishment with a BS 320 if data to be transmitted are generated.

At this point, the UE 310 may establish uplink transmission synchronization with the BS 320 through a random access procedure and transmit an RRC connection request (RRCConnectionRequest) message to the BS 320 in operation 350. The RRC connection request message may include an identifier of the UE 310, a cause for setting up the connection, etc.

Further, in operation 353, the BS 320 may transmit an RRC connection setup (RRCConnectionSetup) message to the UE 310 so that the UE 310 sets up the RRC connection. The RRC connection setup message may include RRC connection configuration information, etc. The RRC connection is also called a signaling radio bearer (SRB) and is used for transmission and reception of the RRC message that is a control message between the UE 310 and the BS 320.

In operation 355, the UE 310 having establishing the RRC connection may transmit an RRC connection setup complete (RRCConnectionSetupComplete) to the BS 320. Meanwhile, the RRC setup complete message includes a control message called a service request that allows the UE 310 to request a bearer setup for a predetermined service to the MME 330. Therefore, the BS 320 may transmit a service request message included in the RRCConnectionSetupComplete message to the MME 330 in operation 357 and the MME 330 may determine whether to provide the service the UE 310 requests.

As the determination result of the MME 330, if the MME 330 decides to provide the service that the UE 310 requests, the MME 330 may transmit an initial context setup request message to the BS 320 in operation 359. The initial context setup request message may include quality of service (QoS) information to be applied when setting up a data radio bearer (DRB) and security related information (e.g., security key, security algorithm) to be applied to the DRB, etc.

In operation 360, the BS 320 may transmit a security mode command (SecurityModeCommand) message to the UE 310 in order to setup security with the UE 310 and in operation 363, the BS 320 may receive a security mode complete (SecurityModeCommand) message from the UE 310.

When the security setup is completed, in operation 365, the BS 320 may transmit an RRC connection reconfiguration (RRCConnectionReconfiguration) message to the UE 310. The RRC connection reconfiguration message includes setup information of the DRB in which user data are processed, and the UE 310 may apply the information to setup the DRB and in operation 367, may transmit an RRC connection reconfiguration complete (RRCConnectionReconfigurationComplete) message.

In operation 369, the BS 320 that is DRB-setup with the UE 310 may transmit an initial context setup complete message to the MME 330. Further, the MME 330 receiving the initial context setup complete message may transmit an S1 bearer setup message to the S-GW 340 in operation 370 to setup the S1 bearer with the S-GW 340 and may receive an S1 bearer setup response message from the S-GW 340 in operation 375. The S1 bearer is a data transmission connection established between the S-GW 340 and the BS 320 and corresponds to a DRB on a one-to-one basis. If all of the procedures are completed, in operations 380 and 385, the UE 310 may transmit and receive data to and from the BS 320 through the S-GW 340.

As described above, the normal data transmission procedure largely consists of three stages RRC connection setup, security setup, and DRB setup. In addition, even when several small packets are transmitted and received, all of the procedures need to be performed. Therefore, even when a large number of UEs 310 intermittently transmit and receive small packets, if all of the procedures are performed, the problem that a signaling overhead may be increased drastically and a battery of the corresponding UEs 310 may also be consumed quickly may arise.

Prior to describing the present disclosure, two methods for solving this will be described. That is, a method (hereinafter, solution A) for storing data by including the data in a non-access stratum (NAS) message through an SRB on a control plane for efficiently processing packets having a small size and intermittently generated and a method (hereinafter, solution B) for storing, by the UE 310 and the network, terminal-related information (hereinafter, UE context) on a user plane and reusing the stored UE-related information at the time of a next connection will be first described. Here, the NAS message means the control message between the UE 310 and the MME 330. The above-mentioned two methods may be applied not only to the general LTE terminal but also to a terminal (for example, NB-internet of things (IoT) terminal, etc.) that mainly transmits small packets.

Figure 4:
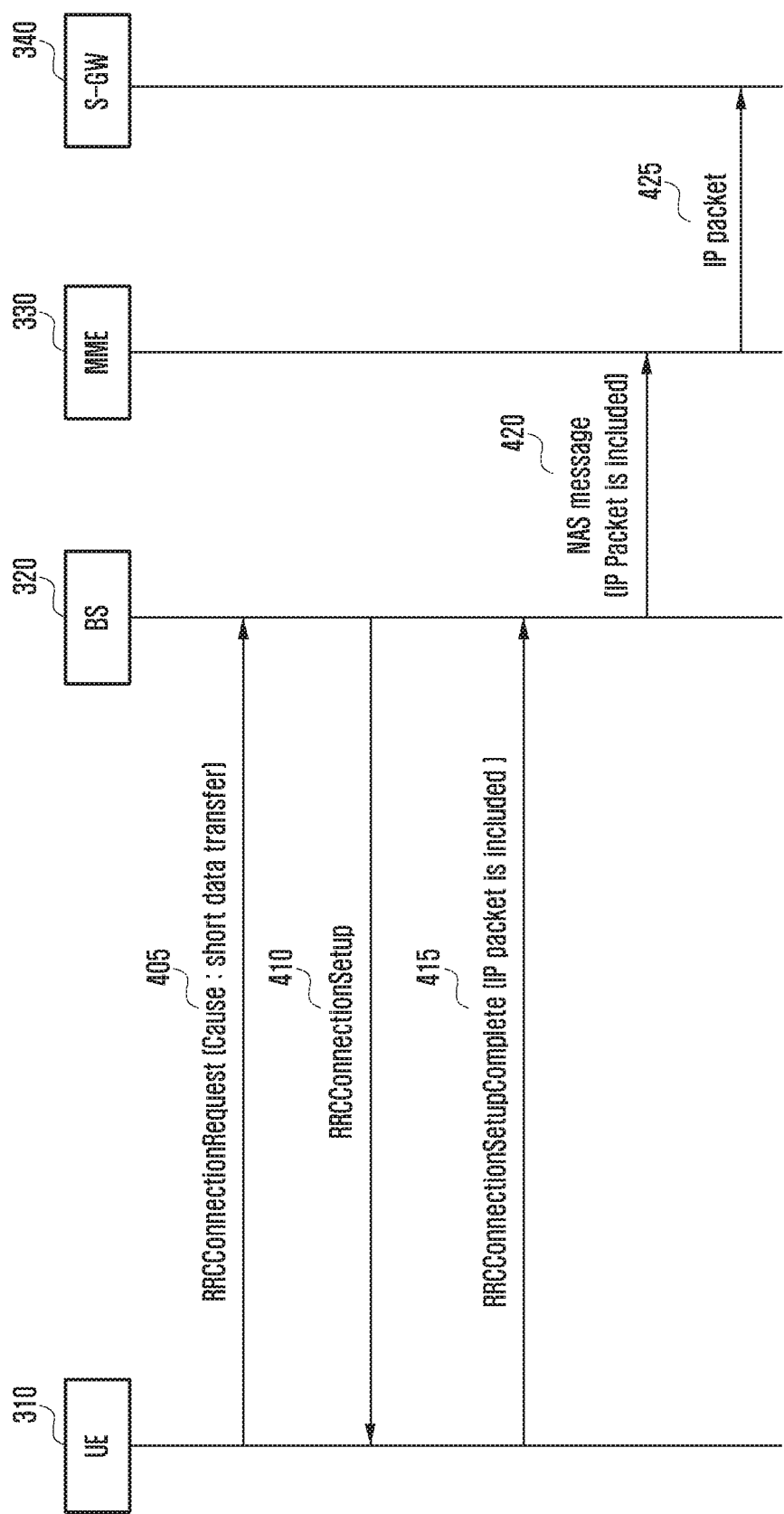
FIG. 4 is a diagram for describing a procedure of solution A of transmitting data by including the data in a non-access stratum (NAS) message through a signaling radio bearer (SRB) of a control plane according to an embodiment of the present disclosure.

FIG. 4 is a diagram for describing a procedure of solution A of transmitting data by including the data in an NAS message through an SRB of a control plane according to an embodiment of the present disclosure.

Referring to FIG. 4, the UE 310 that is not currently set up may perform the RRC connection establishment with the BS if data to be transmitted are generated. At this point, if it is determined that the UE 310 transmits small packets through a predetermined condition check procedure, the UE 310 establishes the uplink transmission synchronization with the BS 320 through the random access procedure and in operation 405, may include a cause for transmitting small packets to an RRCConnectionRequest message and transmit the cause to the BS 320. According to the embodiment, the UE 310 may use the RRCConnectionSetupComplete message in operation 415 to notify that the UE 310 will transmit the small packets to the BS 320.

In operation 410, the BS 320 may transmit an RRCConnectionSetup message so that the UE 310 sets up the RRC connection. Further, in operation 415, the UE 310 having establishing the RRC connection includes packets in a space called dedicated NAS information (dedicatedNASInfo) of the RRCConnectionSetupComplete message and transmit the packets to the BS 320. According to the embodiment, in operation 415, the UE 310 may be modified to transfer two NAS messages while concatenating the two NAS messages with each other. That is, in operation 415, the UE 310 may store both of a normal service request message (or a tracking area update (TAU) REQUEST message) and the NAS message including small packets in the RRCConnectionSetupComplete message. If the BS 320 successfully receives the RRCConnectionSetupComplete message, in operation 420, the BS 320 may transmit the small packets to the MME 330. Further, in operation 425, the MME 330 may the small packets to the S-GW 340.

The simplified procedure of the solution A may reduce the signaling overhead and the battery consumption when the UEs 310 intermittently transmit the small packets.

Figure 5:
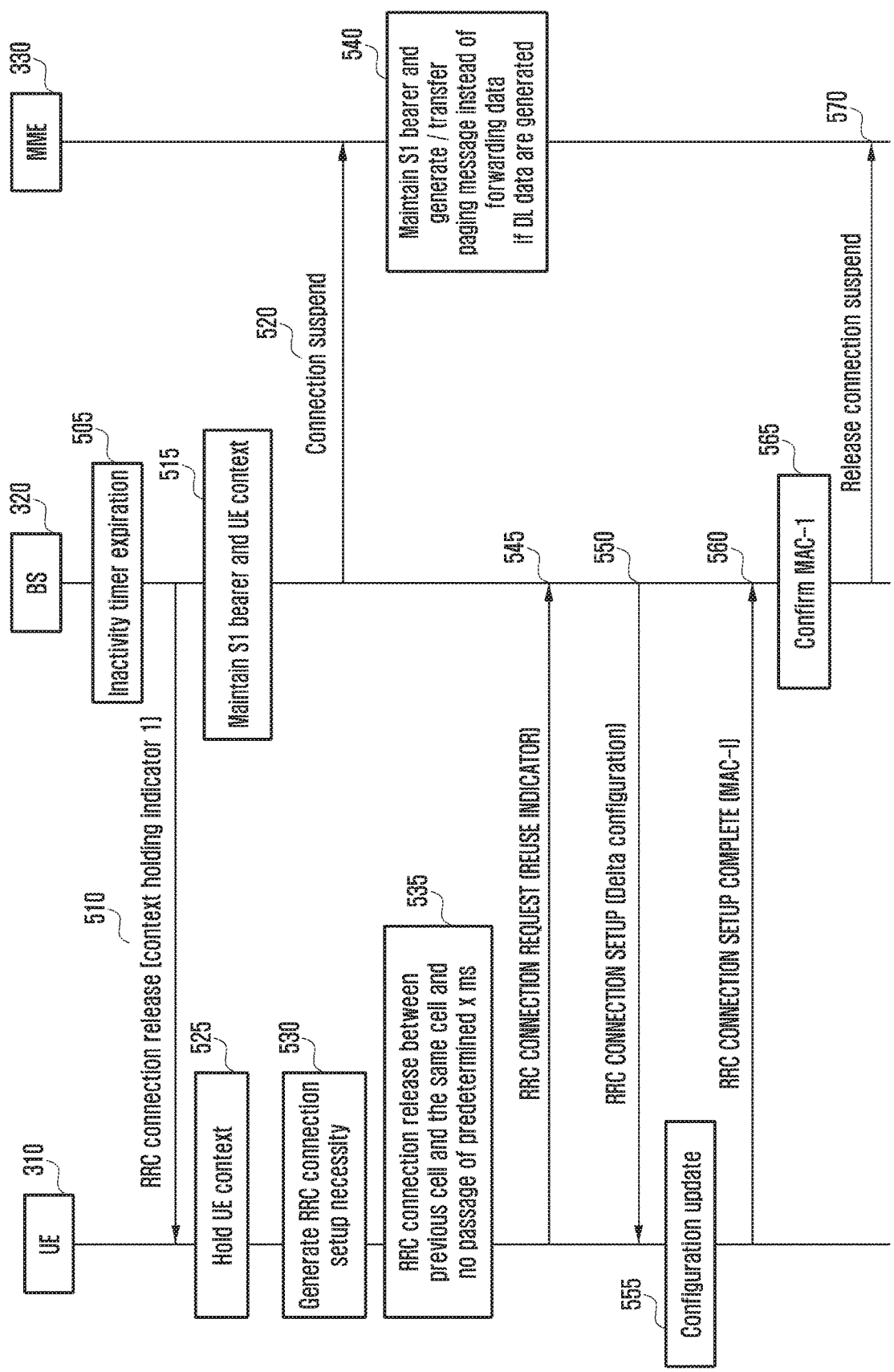
FIG. 5 is a diagram for explaining a procedure of solution B for reusing user equipment (UE)-related information in a user plane according to an embodiment of the present disclosure.

FIG. 5 is a diagram for explaining a procedure of solution B for reusing UE-related information in a user plane according to an embodiment of the present disclosure.

Referring to FIG. 5, even if the RRC connection of the UE 310 is released, the BS 320 stores the UE-related information without releasing the UE-related information for a predetermined period of time, such that the UE 310 may use a simpler procedure than the general RRC connection setup procedure when it sets up the RRC connection in the same cell.

The UE 310 in the RRC connection state may perform data transmission/reception with the BS 320. Further, when the data transmission/reception stops, the BS 320 drives a predetermined timer and in operation 505, if the data transmission/reception is not resumed until the timer expires, the BS 320 may consider releasing the RRC connection of the UE 310. At this point, the BS 320 may determine whether to remove the UE context and retain the UE context for a predetermined period of time after releasing the RRC connection of the UE 310 according to a predetermined rule. For example, in the case of the UE 310 intermittently generating small data when past traffic characteristics of the UE 310 are analyzed, the BS 320 may decide to retain the context of the UE 310.

When the BS 320 decides to retain the context of the UE 310, in operation 510, the BS 320 may notify the UE 310 that the context is retained while transmitting a control message (for example, RRC connection release message) instructing the UE 310 to release the RRC connection. The control message may include a list of cells, or the like to which a procedure of using the stored context may be applied, when the BS 320 tries to again setup the RRC connection within the period when the UE context is retained or the expiration date of the UE 310.

The BS 320 may release the RRC connection of the UE 310 and then in operation 515, retain the UE context and the S1 bearer of the UE 310 as they are. The S1 bearer is called an S1-control bearer used to transmit and receive the control message between the BS 320 and the MME 330 and an S1-user (S1-U) plane bearer used to transmit and receive user data between the BS 320 and the S-GW 340. By retaining the S1 bearer, it is possible to omit the procedure for S1 bearer setup when the UE 310 tries to setup an RRC connection in the same cell or in the same BS 320. Meanwhile, if the expiration date expires, the BS 320 may delete the UE context and release the S1 bearer.

Further, in operation 520, the BS 320 may transmit a control message requesting a connection suspend to the MME 330. In operation 540, the MME 330 receiving the control message requesting the connection suspend may instruct the S-GW 340 not to transmit downlink data to the BS 320 when the downlink data for the UE 310 is generated and instruct the MME 330 to make a request to start a paging procedure, and the S-GW 340 may be operated accordingly. If the S-GW 340 is not operated as described above, that is, the S-GS 340 transmits the downlink data to the BS 320, the BS 320 receiving the downlink data for the UE 310 having released the RRC connection stores the data in a buffer and then needs to perform a paging procedure. Further, if the UE 310 already moves to an area of another BS 320, there is a trouble in requesting the MME 330 to start the paging procedure. In order to avoid this, the BS 320 transmits, to the MME 330, a connection suspend control message for the UE 310 having released the RRC connection but the UE context is stored.

Meanwhile, the UE 310 receiving the RRC connection release message including information instructing the context to be retained in the operation 510 may release the RRC connection, but drive the timer corresponding to an expiration date, write a valid cell list in a memory, and retain the current UE context in the memory without deleting the current UE context, in operation 525. The UE context means various information associated with the RRC connection of the UE 310 and includes SRB setup information, DRB setup information, security key information, etc.

Next, in operation 530, for any reason, a request to setup the RRC connection may be generated. In this case, the UE 310 that does not receive an instruction to retain a context during the previous RRC connection release may start the normal RRC connection setup procedure. However, the UE 310 that receives an instruction to retain a context during the RRC connection release in the previous operation 530 may, in operation 535, check whether the expiration date (for example, x ms) elapses and whether the current serving cell is a cell receiving the RRC connection release message in which the UE context is retained in order to determine whether to apply the normal RRC connection procedure and apply the simplified RRC connection procedure. Further, when both of the above-mentioned two conditions are satisfied, the UE 310 may start the 'RRC connection setup procedure using the stored UE context'. The 'RRC connection setup procedure using the stored UE context' may consist of an operation of transmitting, by the UE 310, a first message to the BS 320, an operation of transmitting, by the BS 320, a second message to the UE 310, and an operation of transmitting, by the UE 310, a third message to the BS 320.

The first message may be a modified RRC connection request message in operation 545, the second message may be a modified RRC connection setup message in operation 550, and the third message may be a modified RRC connection setup complete message in operation 560.

Describing in more detail, in operation 545, the UE 310 may transmit the modified RRC connection request message to the BS 320. The BS 320 may search for the UE context of the UE 310 by referring to the identifier of the UE 310 indicated in the RRC connection request message.

Further, in operation 550, the BS 320 may determine the configuration to be applied to the RRC connection of the UE 310 on the basis of the searched UE context and transmit the modified RRC connection setup message including the configuration information to the UE 310.

The modified RRC connection request message may be a control message in which information (for example, REUSE INDICATOR) indicating 'reuse of RRC context' is included in the normal RRC connection request message.

Further, the modified RRC connection setup message includes various information related to the RRC connection setup of the UE 310 like the RRC connection setup message. When the UE 310 receives the normal RRC connection setup message, the UE 310 sets up the RRC connection on the basis of the setup information indicated in the RRC connection setup message, but when the UE 310 receives the modified RRC connection setup message in operation 550, the UE 310 may setup the RRC connection in consideration of both of the configuration information stored in the UE 310 and the configuration information indicated in the control message (modified RRC connection setup message) (delta configuration). That is, in operation 555, the UE 310 may determine the configuration information indicated in the modified RRC connection setup message as the delta information on the configuration information stored in the UE 310 and update the configuration information or the UE context. For example, if the modified RRC connection setup message includes the SRB setup information, the SRB is configured by applying the indicated SRB setup information, and if the SRB setup information is not included in the modified RRC connection setup message, the SRB may be configured by applying the SRB setup information stored in the UE context.

Further, in operation 560, the UE 310 may configure the RRC connection by applying the updated UE context and the configuration information and transmit the modified RRC connection setup complete message to the BS 320. The modified RRC connection setup completion message may be a control message in which message authentication code-integrity (MAC-I) is added to the normal RRC connection setup completion message. The MAC-I is a message authentication code calculated by the UE 310 for the control message by applying the security information of the restored UE context, that is, applying a security key and a security counter.

Upon receiving the modified RRC connection setup completion message, the BS 320 may confirm the integrity of the changed RRC connection setup completion message using the MAC-I of the changed RRC connection setup complete message, the security key and the security counter stored in the UE context, etc., in operation 565. Further, if the integrity confirmation succeeds, in operation 570, the BS 320 may transmit the control message requesting the connection suspend release to the MME 330. Meanwhile, although not illustrated, when receiving the control message requesting the connection suspend release, the MME 330 may instruct the S-GW 340 to normally process data for the UE 310.

Further, when the process is completed, the UE 310 may resume data transmission/reception in the cell. The above process is also applicable to RRC connection reestablishment through the predetermined modification.

The simplified procedure of the solution B may reduce the signaling overhead and the battery consumption by reusing the UE-related information when the UEs 310 intermittently transmits the small packets.

In order to reduce the battery of the UE and reduce the signaling overhead, a technique of selecting and applying the solution A (technique of transmitting a small packet through the SRB) or the solution B (technique of reducing the signaling overhead by retaining the RRC context even in the idle state of the UE) as described above is suggested.

FIGS. 6, 7, 8, and 9 illustrate the overall operation of the embodiment of the present disclosure according to various embodiments of the present disclosure.

Figure 6:
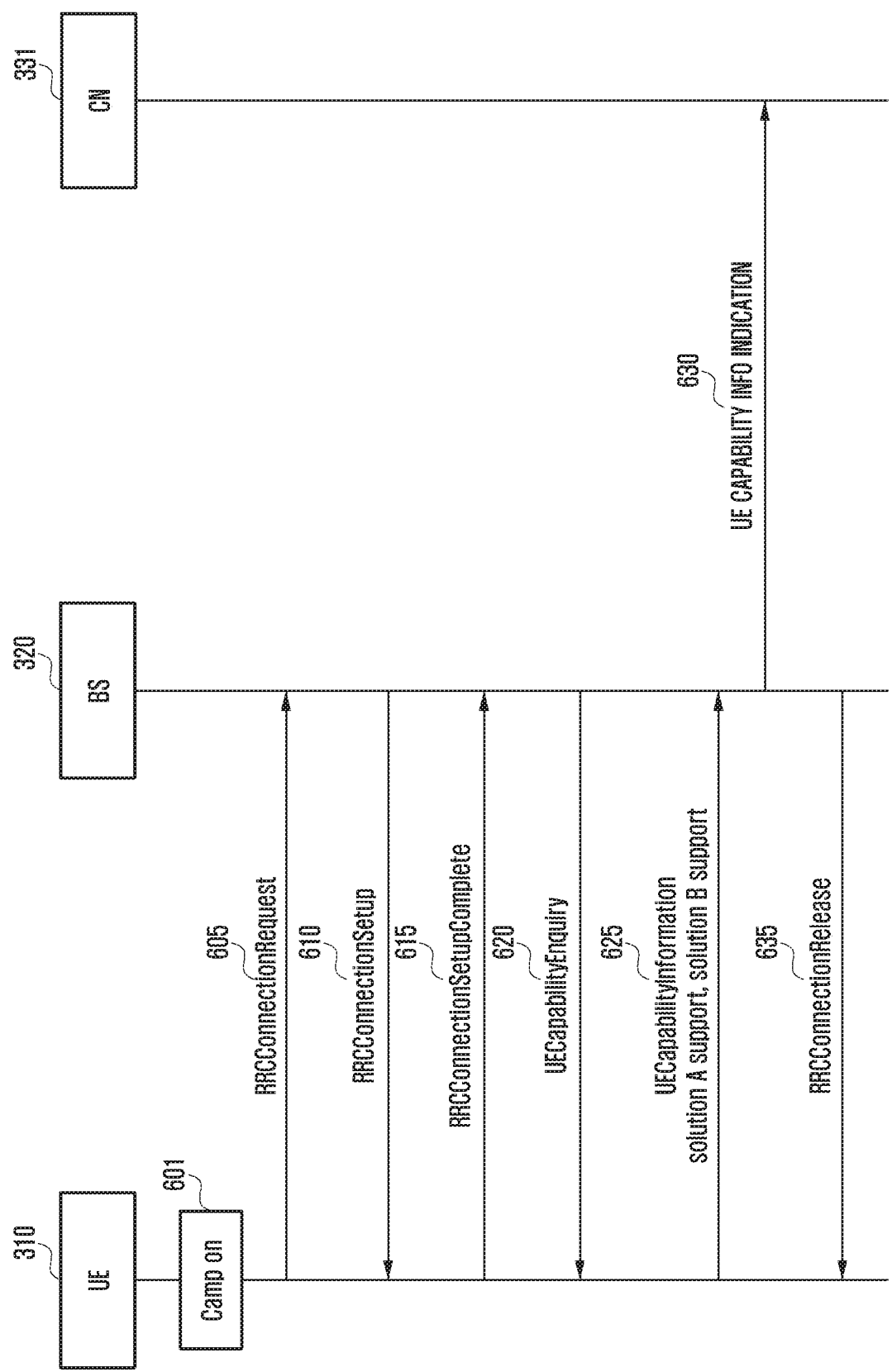
FIG. 6 is a diagram illustrating a procedure of reporting, by a terminal, whether the solution A and the solution B are supported according to an embodiment of the present disclosure.

FIG. 6 is a diagram illustrating a procedure of reporting, by a terminal, whether the solution A and the solution B are supported according to an embodiment of the present disclosure.

Referring to FIG. 6, the overall operation of the present embodiment broadcasts whether the solution A or the solution B is supported through the system information in a specific cell and is performed by the procedure of determining, by the UE 310 receiving the solution A or the solution B, what solution is applied in the specific cell in consideration of 'solution supported in the current serving cell', 'solution supported by the UE', 'solution agreed to use with MME,' 'whether DRB is set', or the like. The UE 310 and the BS 320 may transmit and receive data by applying the solution selected by the procedure.

The embodiment of the present disclosure suggests a solution negotiation procedure with the MME 330 and an operation of determining a solution to be applied by the UE 310.

First, if the UE 310 that is not currently connected and is in a camp on in operation 601, the UE 310 may perform the RRC connection establishment procedure with the BS when the control signaling (or data) to be transmitted is generated. For this purpose, the UE 310 establishes the uplink transmission synchronization with the BS 320 through the random access procedure, and transmits an RRCConnectionRequest message to the BS 320 in operation 605. The RRCConnectionRequest message may include the identifier of the UE 310, a cause for setting up the connection, etc.

In operation 610, the BS 320 may transmit an RRCConnectionSetup message to the UE 310 so that the UE 310 sets up the RRC connection. The RRCConnectionSetup message may include the RRC connection configuration information, etc. The RRC connection is also called a signaling radio bearer (SRB) and is used for transmission and reception of the RRC message that is a control message between the UE 310 and the BS 320.

In operation 615, the UE 310 having establishing the RRC connection transmits an RRCConnectionSetupComplete message to the BS 320. At this point, if the capability of the UE 310 is not known to the BS 320, in operation 620, the BS 320 transmits a UE capability enquiry (UECapabilityEnquiry) message to the UE 310 to indicate a capability report.

Further, in operation 625, the UE 310 may report the UE capability (UECapabilityInformation) to the BS 320 according to the instruction of the BS 320. The UE capability report information includes various capabilities of the UE. For example, information on the antenna configuration, a buffer size of the UE, a maximum transmission/reception speed of the UE, and the like are reported. Further, the information indicating that the UE 310 supports the solution A or the solution B may be included.

In operation 630, the BS 320 may transmit the UE capability information to the CN 331 through a UE capability information indication (UE CAPABILITY INFO INDICATION) message. At this point, the CN 331 may include the MME 330.

Thereafter, if no data are generated in the UE 310 and the BS 320 for a predetermined period of time, in operation 635, the BS 320 may transmit an RRCConnectionRelease message to the UE to release the connection of the UE 310.

Figure 7:
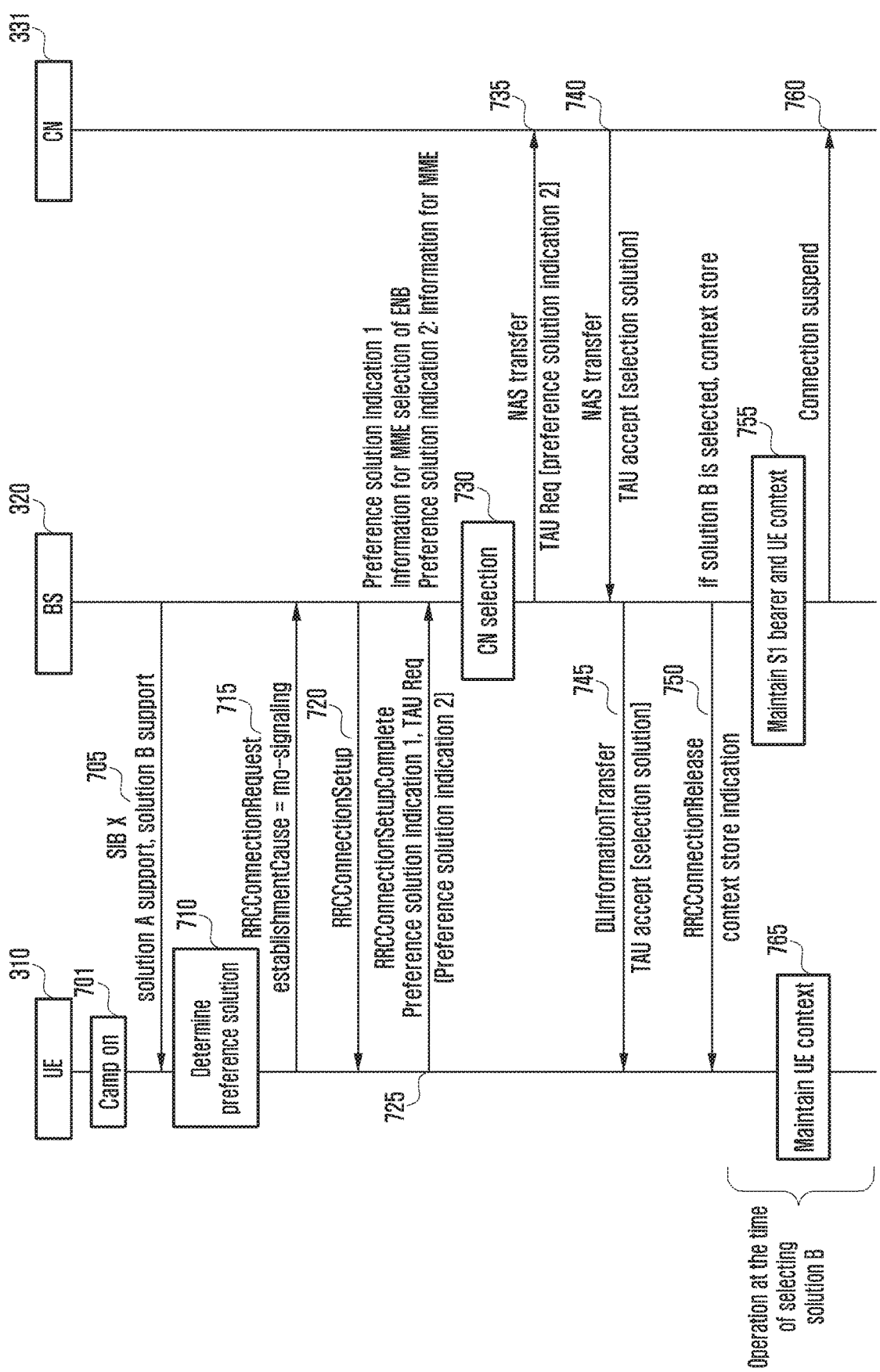
FIG. 7 is a diagram illustrating a procedure of negotiating which solution a terminal, a base station, and a core network node use according to an embodiment of the present disclosure.

FIG. 7 illustrates the overall operation of the embodiment of the present disclosure following FIG. 6.

FIG. 7 is a diagram illustrating a procedure of negotiating which solution a terminal, a BS, and a core network node use according to an embodiment of the present disclosure.

Referring to FIG. 7, the UE 310 that is in the camp on in operation 701 may receive system information (for example, system information block (SIB) X) of the corresponding cell from the BS 320 in operation 705. The system information includes a bandwidth of the corresponding system, a system frame number, cell reselection related information, and the like. Further, according to the present disclosure, the system information may include the information on whether the BS 320 supports the solution A or the solution B.

In operation 710, the UE 310 that receives the system information confirms whether the BS 320 supports the solution A or the solution B and may determine the preferred solution supported by the UE 310 itself. The determination of the preferred solution may be determined according to a predetermined algorithm, a given situation, characteristics of the UE 310, and the like. For example, if a small packet is expected to be mainly generated and both solution A and solution B are supported in the corresponding cell, the UE 310 may select the solution A as the preferred solution. As another example, if the UE 310 has considerable mobility and supports both solutions in the corresponding cell, the UE 310 selects the solution A as the preferred solution and if the UE 310 has limited mobility and supports the two solutions in the corresponding cell, the UE 310 may select the solution B as the preferred solution. Further, if only one solution is supported in the corresponding cell, the supported solution may be selected as the preferred solution.

To notify the network of the information on the solution preferred by the UE 310 using the control message, in operation 715, the UE 310 may establish the uplink transmission synchronization with the BS 320 through the random access procedure and transmit the RRCConnectionRequest message to the BS 320. The RRCConnectionRequest message includes the identifier of the UE 310, a control message transmission (mo-signaling) as the cause for setting up the connection, and other information.

Thereafter, in operation 720, the BS 320 may transmit the RRCConnectionSetup message to the UE 310 so that the UE 310 sets up the RRC connection. The RRCConnectionSetup message includes the RRC connection configuration information, etc. The RRC connection is also called an SRB and is used for transmission and reception of the RRC message that is a control message between the UE 310 and the BS 320.

Further, in operation 725, the UE 310 having establishing the RRC connection may transmit the RRCConnectionSetupComplete message to the BS 320. To transmit the information on the solution preferred by the UE 310 to the BS 320 and the CN 331, respectively, the UE 310 may include the information (hereinafter, preferred solution indication 1) for the BS 320 and the information (hereinafter, preferred solution indication 2) for the MME 330 of the network in the RRCConnectionSetupComplete message. The solution indication 2 for transmitting the preferred solution of the UE 310 to the MME 330 is included in a NAS message such as a TAU request message, a service request message, and an attach request message, in which the NAS message may also be transferred by being included in the RRCConnectionSetupComplete message.

In operation 730, the BS 320 receiving the RRCConnectionSetupComplete message may confirm the preferred solution of the UE 310 and select the MME 330 of the network supporting the preferred solution. At this point, the selection of the MME 330 may be performed according to the preferred solution indication 1 included in the RRCConnectionSetupComplete message.

Further, in operation 735, the BS 320 may transfer the NAS message (e.g., TAU request message, attach request message, service request message, or the like) including the preferred solution information of the UE 310 to the selected MME 330 of CN 331.

In operation 740, the MME 330 of CN 331 may select a solution to be used in the CN 331 by referring to the solution preferred by the UE 310 through the NAS message, and may transmit information on the selected solution to the BS 320. At this time, the MME 330 of CN 331 may transfer the NAS message (for example, TAU accept message, attach accept message, etc.) to the BS 320, including information on the selected solution.

In operation 745, the BS 320 may transmit the selected solution information to the UE 310 by including the selected solution in, for example, the TAU accept message.

Further, in operation 750, the connection of the UE 310 may be released. If the selected solution is the solution B, in operation 750, the BS 320 may notify the UE 310 that the UE context is retained while transmitting the RRCConnectionRelease message instructing the UE 310 to release the RRC connection. The control message (RRCConnectionRelease message) may include a list of cells, or the like to which the procedure of using the stored UE context may be applied, when the BS 320 tries to again setup the RRC connection within the period when the UE context is retained or the expiration date of the UE 310. In operation 755, the BS 320 may release the RRC connection of the UE 310 and then retain the UE context and the S1 bearer of the UE 310 as they are. Further, in operation 760, the BS 320 may transmit the control message requesting the connection suspend to the MME 330 of CN 331. Meanwhile, although not illustrated, the MME 330 receiving the control message requesting the connection suspend may instruct the S-GW 340 not to transmit downlink data to the BS 320 when the downlink data for the UE 310 is generated and instruct the MME 330 to make a request to start the paging procedure, and the S-GW 340 may be operated accordingly. Meanwhile, the UE 310 receiving the RRC connection release message including information instructing the UE context to be retained in the operation 750 may release the RRC connection, but drive the timer corresponding to the expiration date, write the valid cell list in the memory, and retain the current UE context in the memory without deleting the current UE context, in operation 765. Meanwhile, the present procedure may use the service request message that is slightly modified, instead of the TAU request message.

Figure 8:
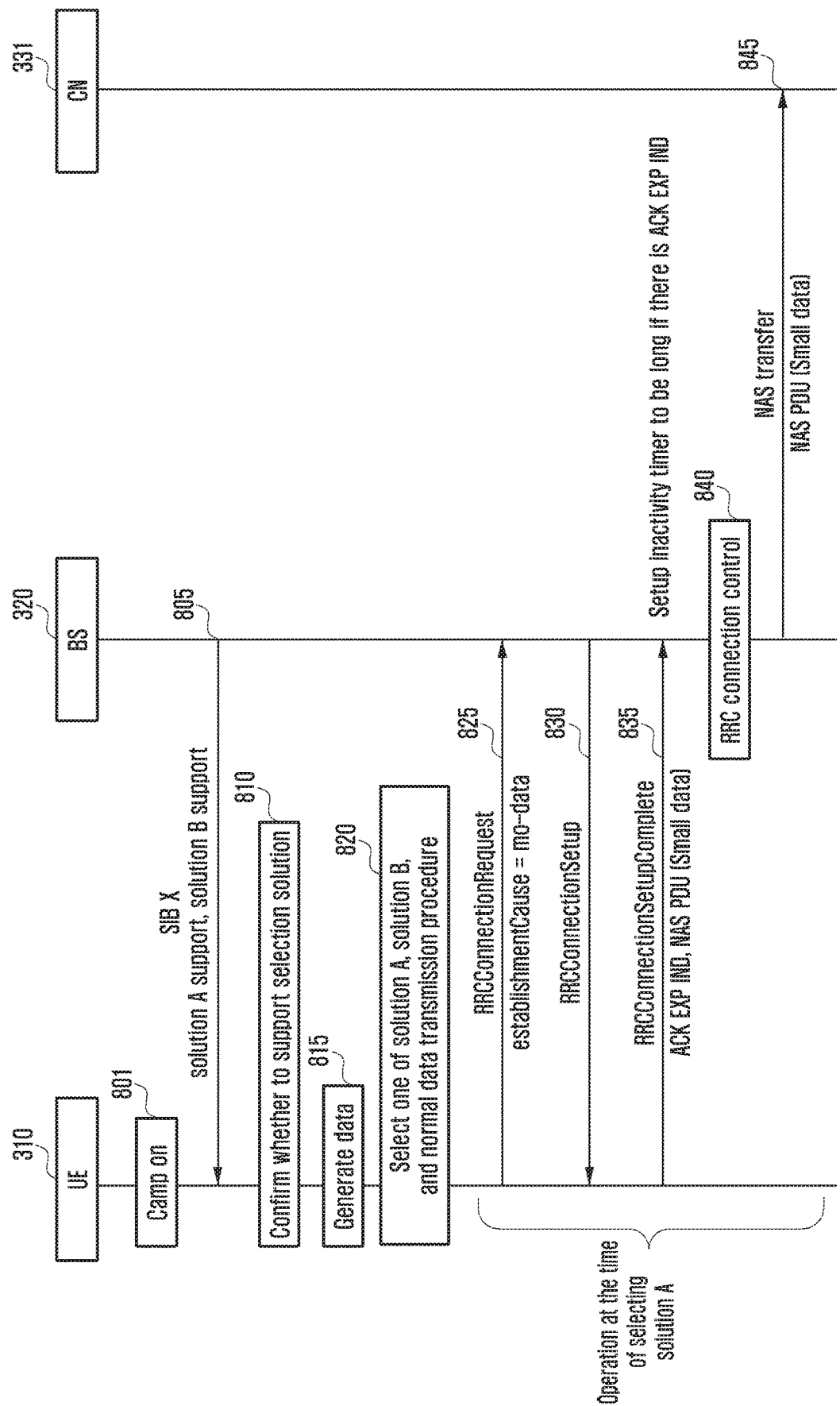
FIG. 8 is a diagram illustrating a procedure of selecting, by a terminal, a solution to transmit data according to an embodiment of the present disclosure.

FIG. 8 illustrates the overall operation of the embodiment of the present disclosure following FIGS. 6 and 7.

FIG. 8 is a diagram illustrating a procedure of selecting, by a terminal, a solution to transmit data according to an embodiment of the present disclosure.

Referring to FIG. 8, the UE 310 that is in the camp on in operation 801 may receive the system information (for example, SIB X) of the corresponding cell in operation 805. The system information may include the information on whether the BS 320 supports the solution A or the solution B.

Meanwhile, in operation 810, the UE 310 may confirm whether the selected solution received from the MME 330 of the network may be supported in the corresponding cell, in the procedure illustrated in FIG. 7. Thereafter, when data to be transmitted to the UE 310 are generated in operation 815, the UE 310 may select the solution A, the solution B, and one of the normal data transmission procedures in the above procedure, in operation 820.

[Operation of Selecting Data Transmission Procedure]
- If the immediately prior selected solution is B, the BS 320 supports the solution B, and the BS 320 notifies that the RRC context of the UE 310 is stored when the immediately prior RRC connection is released (or if the indicator instructing the solution B to be used or the indicator instructing the UE 310 to store the RRC context without discarding the RRC context is included in the immediately prior RRC connection release message), the UE 310 selects the solution B.
- The immediately prior selected solution is A and the BS 320 supports only the solution A.
  ■ The UE 310 selects the solution A.
- The immediately prior selected solution is A and the BS 320 supports both of the solution A and the solution B.
  ■ If the BS 320 notifies that the RRC context of the UE 310 is stored when the immediately prior RRC connection is released (or if the indicator instructing the solution B to be used or the indicator instructing the UE 310 to store the RRC context without discarding the RRC context is included in the immediately prior RRC connection release message), the UE 310 selects the solution B.
- Else, the UE 310 selects the solution A.
- When the immediately prior selected solution is not supported by the BS 320.
  - The UE 310 selects the normal data transmission procedure.

If the UE 310 selects the solution A, a procedure similar to that of FIG. 4 may be progressed. In order for the UE 310 to perform the RRC connection establishment procedure with the BS 320, in operation 825, the UE 310 may establish the uplink transmission synchronization with the BS 320 through the random access procedure and transmit the cause for transmitting the small packet to the BS 320 by including the clause in the RRCConnectionRequest message. Therefore, in operation 830, the BS 320 may transmit the RRC-ConnectionSetup message to the UE 310 so that the UE 310 sets up the RRC connection.

Further, in operation 835, the UE 310 having establishing the RRC connection may transmit data, which are to be transmitted, to the BS by including the data in the NAS PDU, together with an ACK EXP IND message instructing an inactivity timer of the BS 320 to be set long in the RRCConnectionSetupComplete message. Meanwhile, the BS 320 may release the RRC connection with the UE 310 when the inactivity timer expires. When the data of the higher layer requesting an ACK signal are included, the inactive timer may be set long so that the acknowledgment signal may be received. According to the embodiment, in operation 835, the UE 310 may be modified to transfer the two NAS messages through the SRB while concatenating the two NAS messages with each other. That is, the UE 310 may set the cause as the mo-signaling in operation 825 and may include the RRCConnectionSetupComplete message together with the normal service request message (or TAU request message) and the NAS message including the small packet in operation 835.

If the BS 320 successfully receives the RRCConnectionSetupComplete message including the NAS PDU including the data, the BS 320 may perform RRC connection control in operation 840 and the BS 320 may transmit the data to the MME 330 of CN 331 in operation 845.

Figure 9:
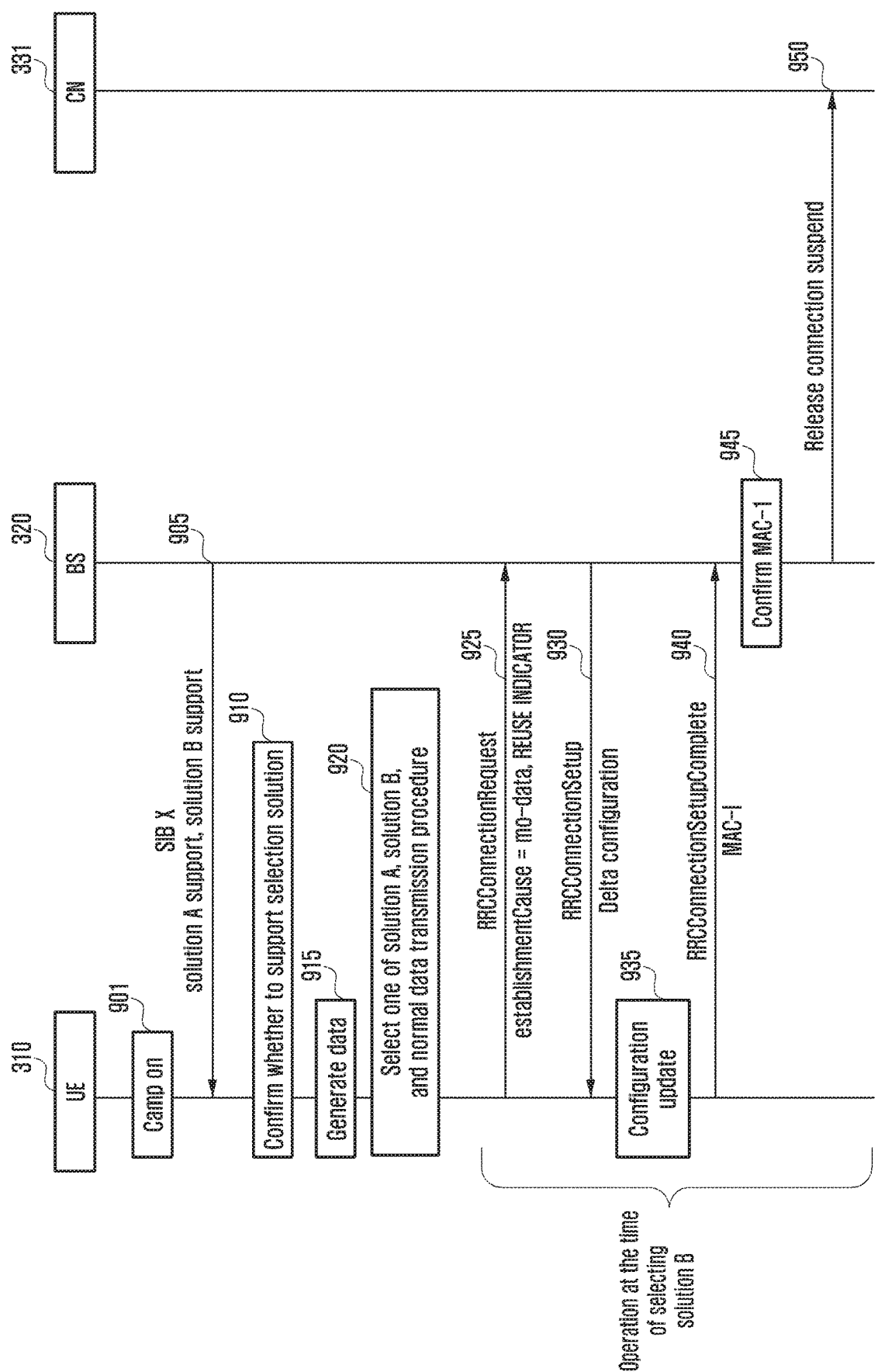
FIG. 9 is a diagram illustrating another procedure of selecting, by a terminal, a solution to transmit data according to an embodiment of the present disclosure.

FIG. 9 illustrates the overall operation of the embodiment of the present disclosure following FIGS. 6, 7, and 8.

FIG. 9 is a diagram illustrating another procedure of selecting, by a terminal, a solution to transmit data according to an embodiment of the present disclosure.

Referring to FIG. 9, if the UE 310 selects the solution B in operation 820 of FIG. 8, the UE 310 and the BS 320 perform the RRC connection setup procedure using the UE context stored in the operations 755 and 765 of FIG. 7. The process can proceed. That is, the 'RRC connection setup procedure may consist of an operation of transmitting, by the UE 310, a first message to the BS 320, an operation of transmitting, by the BS 320, a second message to the UE 310, and an operation of transmitting, by the UE 310, a third message to the BS 320.

The first message may be a modified RRC connection request message in operation 925, the second message may be a modified RRC connection setup message in operation 930, and the third message may be a modified RRC connection setup complete message in operation 940.

Describing in more detail this, the UE 310 that is in the camp on in operation 901 may receive the system information (for example, SIB X) of the corresponding cell in operation 905. The system information may include the information on whether the BS 320 supports the solution A or the solution B.

Meanwhile, in operation 910, the UE 310 may confirm whether the selected solution received from the MME 330 of the network may be supported in the corresponding cell, in the procedure illustrated in FIG. 7. Thereafter, when the data to be transmitted to the UE 310 are generated in operation 915, the UE 310 may select the solution A, the solution B, and one of the normal data transmission procedures in operation 920. The description thereof is already described and therefore the detailed description thereof will be omitted.

If the UE 310 selects the solution B, a procedure similar to that of FIG. 5 may be progressed. In operation 925, the UE 310 may transmit the modified RRC connection request message to the BS 320. The BS 320 may search for the UE context of the UE 310 by referring to the identifier of the UE 310 indicated in the RRC connection request message.

Further, in operation 930, the BS 320 may determine the configuration to be applied to the RRC connection of the UE 310 on the basis of the searched UE context and transmit the modified RRC connection setup message including the configuration information to the UE 310.

The modified RRC connection request message may be a control message in which information (for example, REUSE INDICATOR) indicating 'reuse of RRC context' is included in the normal RRC connection request message.

Further, the modified RRC connection setup message includes various information related to the RRC connection setup of the UE 310 like the RRC connection setup message. When the UE 310 receives the normal RRC connection setup message, the UE 310 sets up the RRC connection on the basis of the setup information indicated in the RRC connection setup message, but when the UE 310 receives the modified RRC connection setup message in operation 930, the UE 310 may setup the RRC connection in consideration of both of the configuration information stored in the UE 310 and the configuration information indicated in the control message (modified RRC connection setup message) (delta configuration) in operation 935.

Further, in operation 940, the UE 310 may configure the RRC connection by applying the UE context and the configuration information and transmit the modified RRC connection setup complete message to the BS 320. The modified RRC connection setup completion message may be the control message in which the MAC-I is added to the normal RRC connection setup completion message. The MAC-I is the message authentication code calculated by the UE 310 for the control message by applying the security information of the UE context, that is, applying a security key and a security counter.

Upon receiving the modified RRC connection setup completion message, the BS 320 may confirm the integrity of the changed RRC connection setup completion message using the MAC-I of the changed RRC connection setup complete message, the security key and the security counter stored in the UE context, etc., in operation 945. Further, if the integrity confirmation succeeds, in operation 950, the BS 320 may transmit the control message requesting the connection suspend release to the MME 330 of CN 331. Meanwhile, although not illustrated, when receiving the control message requesting the connection suspend release, the MME 330 may instruct the S-GW 340 to normally process data for the UE 310 on the basis of the existing configuration information.

Further, when the process is completed, the UE 310 may resume data transmission/reception in the cell. The above process is also applicable to RRC connection reestablishment through the predetermined modification.

Figure 10:
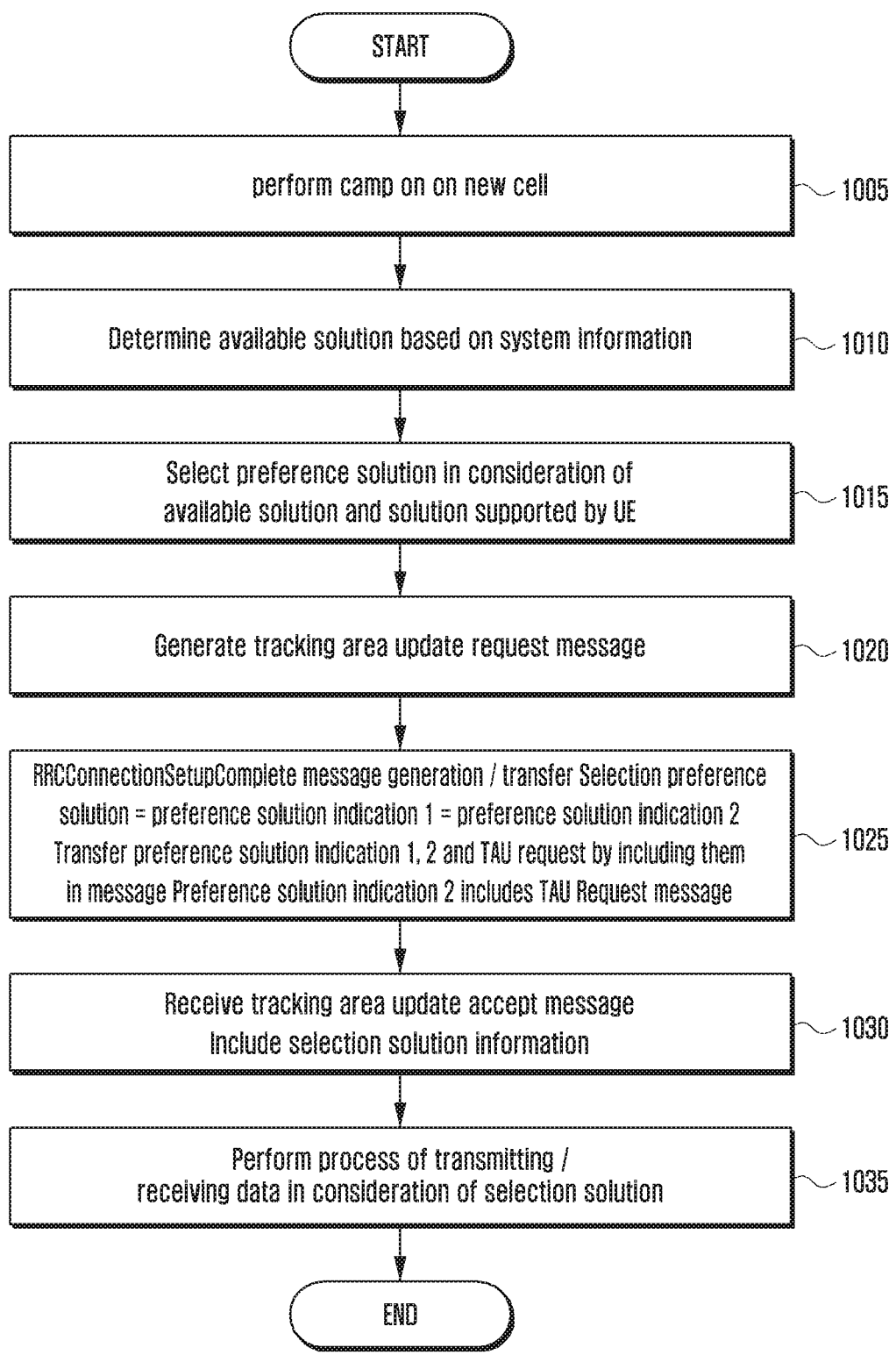
FIG. 10 is a diagram illustrating a procedure of negotiating, by a terminal, a solution with mobility management entity (MME) according to an embodiment of the present disclosure.

FIG. 10 is a diagram illustrating a procedure of negotiating, by a terminal, a solution with MME according to an embodiment of the present disclosure.

Referring to FIG. 10, in operation 1005, the UE 310 performs the camp on a cell. Further, in operation 1010, the UE 310 may receive the system information of the corresponding cell and determine the solutions supported by the corresponding BS 320 on the basis of the received system information.

In operation 1015, the UE 310 may select the solution preferred by the UE 310 in consideration of the solutions supported by the BS 320 and the solutions supported by the UE 310. In operation 1020, the UE 310 may generate, for example, the TAU request message to notify the network of the solution preferred by the UE 310. The service request message, or the like may be used through the predetermined modification.

In order for the UE 310 to transmit the information on the preferred solution to the BS 320 and the CN 331 in operation 1025, the UE 310 may transmit the solution indication 1 for the BS 320 and the solution indication 2 for the CN 331 to the BS 320 by including the solution indication 1 and the solution indication 2 in the RRCConnectionSetupComplete message. The solution indication 2 may be included in the TAU request message. In operation 1030, the UE 310 may receive the TAU accept message to receive the information on the selected solution from the CN 331. In operation 1035, the UE 310 may perform the data transmission/reception procedure in consideration of the selected solution.

Figure 11:
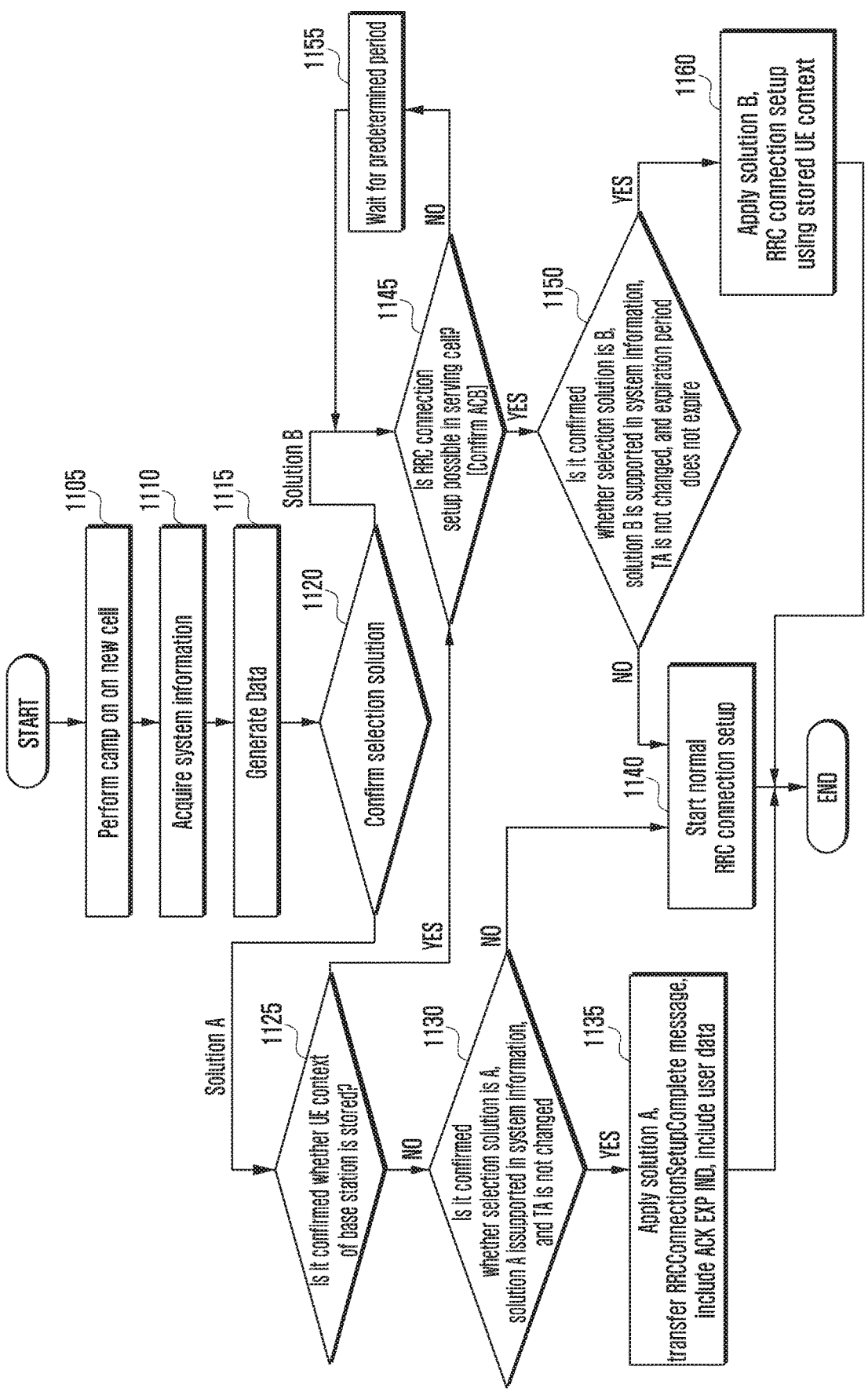
FIG. 11 is a diagram illustrating an operation of transmitting, by a terminal, data according to an embodiment of the present disclosure.

FIG. 11 is a diagram illustrating an operation of transmitting, by a terminal, data according to an embodiment of the present disclosure.

Referring to FIG. 11, in operation 1105, the UE 310 performs the camp on a cell. Further, in operation 1110, the UE 310 may receive the system information of the corresponding cell and determine the solutions supported by the corresponding BS 320 on the basis of the received system information.

Further, in operation 1115, the data to be transmitted by the UE 310 may be generated. At this point, in operation 1120, the UE 310 may confirm the solution already selected by the CN 331, and if the solution is the solution A, the UE 310 may proceed to operation 1125.

In operation 1125, the UE 310 can confirm whether the BS 320 stores the UE context. That is, when the immediately prior RRC connection is released, if the BS 320 notifies the UE 310 that the RRC context of the UE 310 is stored (or if an indicator indicating that the solution B is used or the indicator instructing the UE 310 to store the RRC context without discarding the RRC context is included in the immediately prior RRC connection release message), it may be determined whether the BS 320 stores the UE context. If the BS 320 stores the UE context, the UE 310 may select the solution B and perform operation 1145. However, if the BS 320 does not store the UE context, the UE may proceed to operation 1130.

In operation 1130, the UE 310 may confirm whether the solution A is supported or the TA is not changed, based on the system information. If the solution A is supported and the TA is not changed, the UE 310 proceeds to operation 1135 to apply the solution A and transmit the ACK EXP IND and the user data the BS 320 by including the ACK EXP IND and the user data in the RRCConnectionSetupComplete message.

If the solution A is not supported or the TA is changed, the UE 310 may proceed to operation 1140 to start the normal general RRC connection setup.

If the selected solution is the solution B in operation 1120, the UE 310 may proceed to operation 1145 to confirm whether the RRC connection setup may be made in the serving cell. More specifically, the UE 310 confirms access class barring (ACB), or the like and determines that the RRC connection setup may start in the corresponding cell only when the access is not barred in the current cell and may proceed to operation 1150. Further, if the access is barred in the current cell, the UE 310 proceeds to operation 1155 and waits for a predetermined period of time and then return to the operation 1140.

In operation 1145, the UE 310 may confirm whether the system supports the solution B, the TA is not changed, and the expiration date of the UE context does not expire. Further, if the system supports the solution B, the TA is not changed, and satisfies the condition that the expiration date of the UE context does not expire, the UE 310 may proceed to operation 1160 to apply the solution B and may setup the RRC connection using the UE context.

If the system supports the solution B, the TA is not changed, and does not satisfy the condition that the expiration date of the UE context does not expire, the UE 310 may proceed to operation 1140 to setup the normal RRC connection.

In the present disclosure, the solution A is a method for transmitting a small packet intermittently generated through the SRB by including the small packet in the NAS message to reduce the signaling overhead and save the battery consumption. However, if the small packet is continuously generated, the control signaling overhead may be rather increased, which may result in increasing a load on the network. Therefore, a method for preventing an abuse of solution A is suggested.

Figure 12:
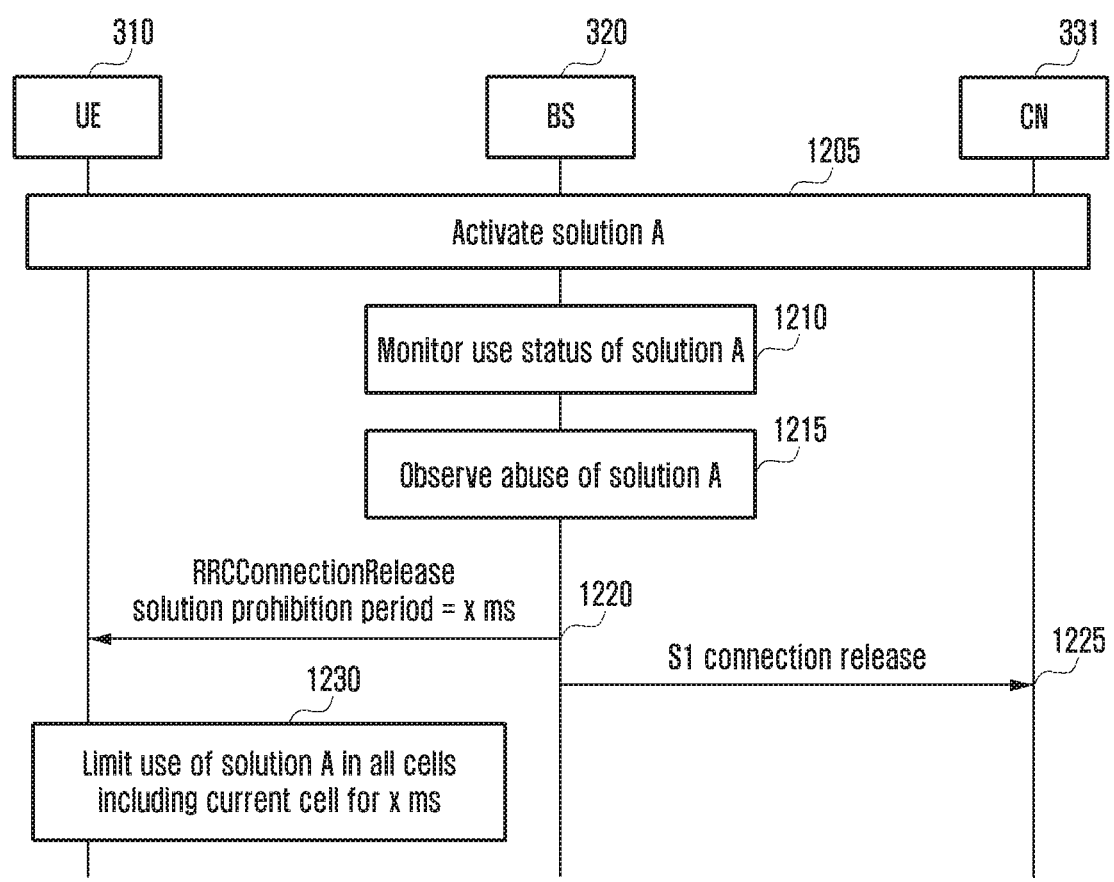
FIG. 12 is a diagram illustrating a procedure of monitoring and preventing, by a base station, an abuse of solution A according to an embodiment of the present disclosure.

FIG. 12 is a diagram illustrating a procedure of monitoring and preventing, by a BS, an abuse of solution A according to an embodiment of the present disclosure.

Referring to FIG. 12, in operation 1205, the UE 310 generates data to be transmitted and transmits the data by applying the solution A. At this point, the BS 320 may monitor the use state of the solution A about whether the solution A is abused if the solution A is activated in operation 1210. As an example, it is determined whether the solution A is abused on the basis of the use frequency of the solution A (or the number/size, or the like of packets transmitted using the solution A) for a predetermined period of time.

If the BS 320 determines that the corresponding UE 310 abuses the solution A in operation 1215 according to the predetermined condition, in operation 1220, the BS 320 generates the RRConnectionRelease message and transmits the generated RRConnectionRelease message to the UE 310 to release the RRC connection. At this point, the RRCConnectionRelease message may include a period (for example, x ms) in which the application of the solution A is barred.

In operation 1230, the UE 310 receiving the RRCConnectionRelease message including the period where the application of the solution A is barred may restrict the use of the solution A, the use of the solution A may be restricted not only in the corresponding serving cell but also in other cells for the solution A barring period. For example, the UE 310 may operate the timer for the corresponding barring period to restrict the use by the x ms.

Further, in operation 1225, the BS 320 may transmit an S1 connection release message to the CN 331 to release the connection of the S1 bearer.

At this point, if the data to be transmitted occur for the barring period, the UE 310 may transmit data using the normal data transmission procedure.

Figure 13:
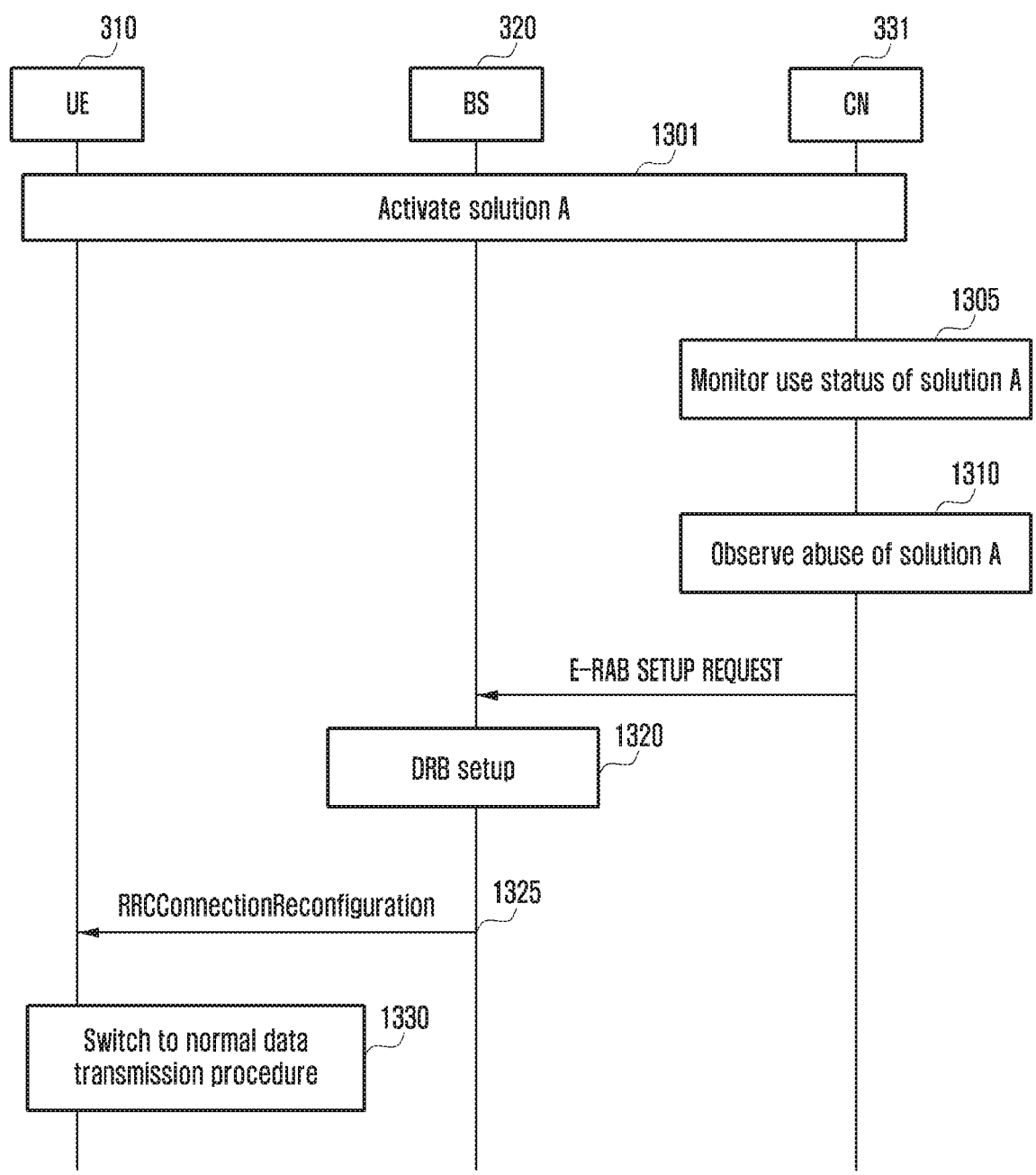
FIG. 13 is a diagram illustrating a procedure of monitoring and preventing, by a network (MME), an abuse of solution A according to an embodiment of the present disclosure.

FIG. 13 is a diagram illustrating a procedure of monitoring and preventing, by a network (MME), an abuse of solution A according to an embodiment of the present disclosure.

Referring to FIG. 13, in operation 1301, the UE 310 generates data to be transmitted and transmits the data by applying the solution A. At this point, the network (for example, MME) 330 may monitor the use state of the solution A about whether the solution A is abused if the solution A is activated in operation 1305. As an example, it may be determined whether or not solution A is abused on the basis of the use frequency of the solution A for the predetermined period of time as in the example of FIG. 12.

If the CN 331 determines that the corresponding UE 310 is abusing the solution A in operation 1310 according to the predetermined condition. In operation 1315, the CN 331 may generate an E-RAB SETUP REQUEST message and transmit the generated E-RAB SETUP REQUEST message to the BS 320. The BS 320 receiving the E-RAB SETUP REQUEST message may setup the DRB in operation 1320 and generate the RRCConnectionReconfiguration message and transmit the generated RRCConnectionReconfiguration message to the UE 310 in operation 1325.

Further, the UE 310 receiving the RRCConnectionReconfiguration message is switched to the normal data transmission procedure in operation 1330. In other words, even if the UE 310 selects the solution A in the operation 820 of FIG. 8 and then is performing the data transmission/reception by applying the solution A, when the DRB is setup, the UE 310 may stop using the solution A (i.e., stops transmitting the user data using the SRB) and start transmitting the user data using the setup DRB. If the DRB is setup, even if the UE 310 agrees with the MME 330 of the solution A and the solution A is supported in the corresponding serving cell, the UE 310 may stop using the solution A and use the setup DRB to transmit and receive data.

Figure 14:
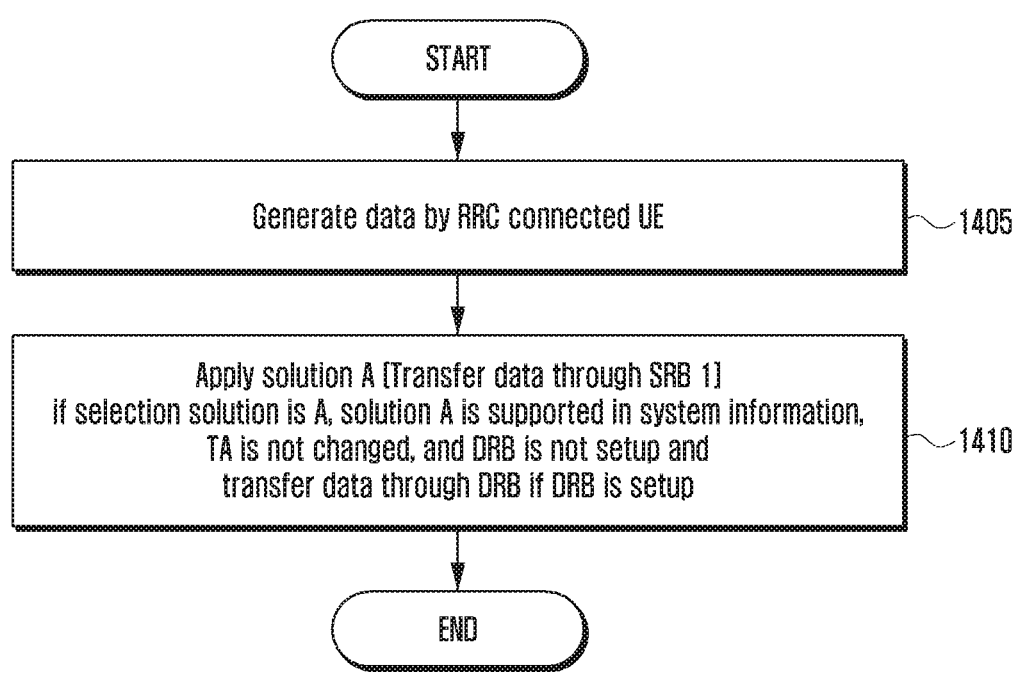
FIG. 14 is a diagram illustrating a terminal operation of a radio resource control (RRC) connected state for determining a data transmission/reception method according to an embodiment of the present disclosure.

FIG. 14 is a diagram illustrating a terminal operation of an RRC connected state for determining a data transmission/reception method according to an embodiment of the present disclosure.

Referring to FIG. 14, in operation 1405, data may be generated by the UE 310 in the RRC connection state. In operation 1410, if the selected solution is A, the solution A is supported in the system information, the TA is not changed, and the DRB is not set, the UE 310 may apply the solution A to transmit the data to the BS 320 through the SRB by including the data in the NAS message Further, if the DRB is setup, the UE 310 may transmit data through the DRB.

Figure 15:
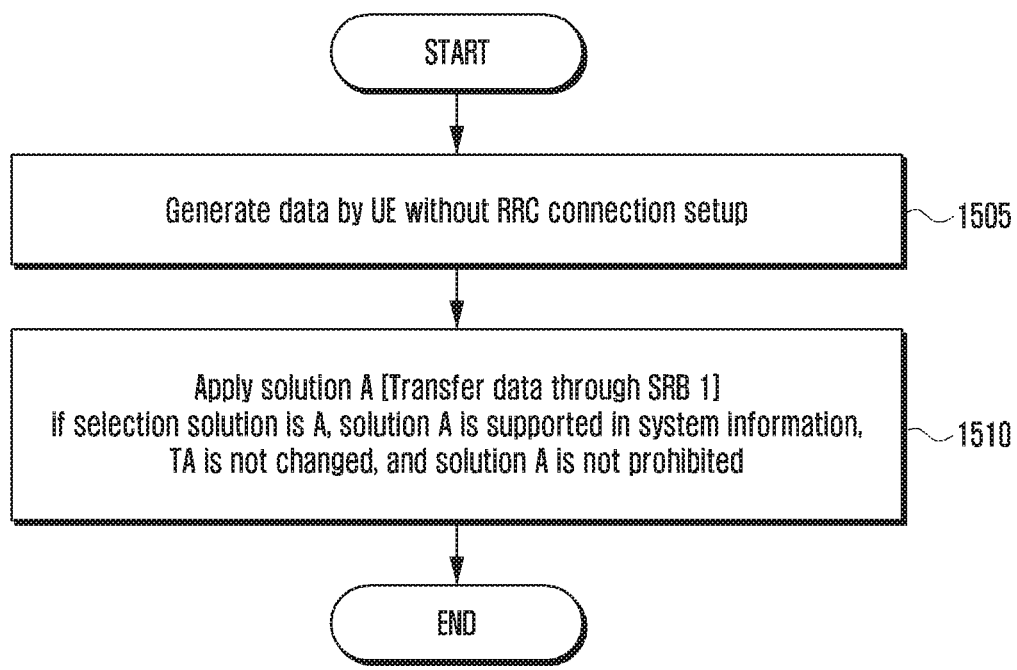
FIG. 15 is a diagram illustrating a terminal operation of an RRC idle state for determining a data transmission/reception method according to an embodiment of the present disclosure.

FIG. 15 is a diagram illustrating a terminal operation of an RRC idle state for determining a data transmission/reception method according to an embodiment of the present disclosure.

Referring to FIG. 15, in operation 1505, the UE 310 may generate data to be transmitted in a state in which it does not have the connection setup with the BS 320. Further, in operation 1510, if the selected solution is A, the solution A is supported in the system information, the TA is not changed and does not belong to the solution A barring period setup by the BS 320, the UE 310 may apply the solution A to transmit the data to the BS 320 through the SRB by including the data in the NAS message.

Figure 16:
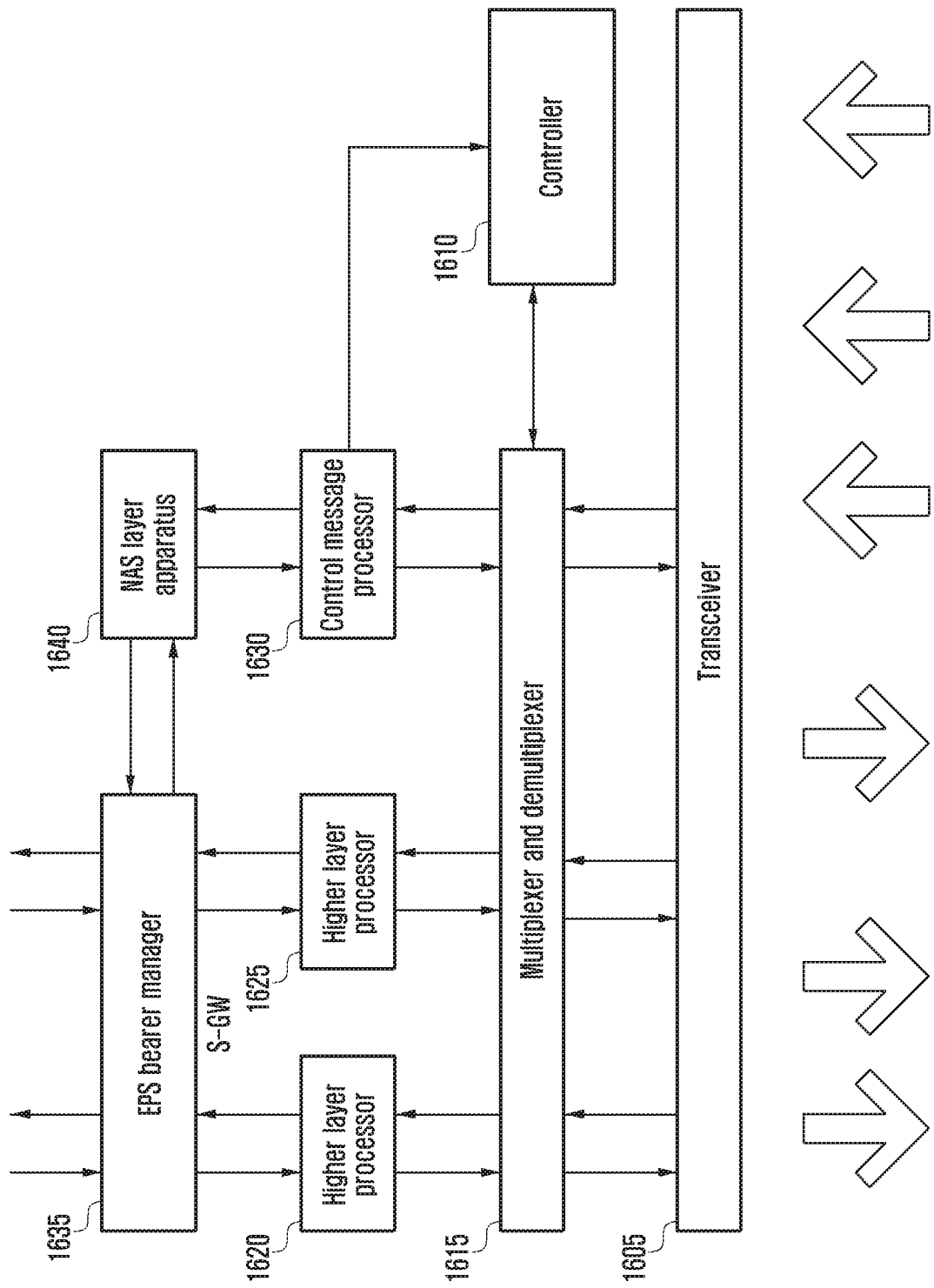
FIG. 16 is a block configuration diagram of a terminal according to an embodiment of the present disclosure.

FIG. 16 is a block configuration diagram of a terminal according to an embodiment of the present disclosure.

Referring to FIG. 16, the UE 310 according to an embodiment of the present disclosure includes a transceiver 1605, a controller 1610, a multiplexer/demultiplexer 1615, a control message processor 1630, various higher layer processors 1620 and 1625, an evolved packet system (EPS) bearer manager 1635, a NAS layer apparatus 1640, and the like.

The transceiver 1605 receives data and a predetermined control signal through a forward channel of the serving cell and transmits the data and the predetermined control signal through a reverse channel. When a plurality of serving cells are configured, the transceiver 1605 transmits and receives data and a control signal through the plurality of carriers.

The multiplexer and demultiplexer 1615 multiplexes data generated from the higher layer processors 1620 and 1625 or the control message processor 1630 or demultiplexes data received by the transceiver 1605 and serves to transmit the data or the control message to the appropriate higher layer processors 1620 and 1625 or the control message processor 1630.

The control message processor 1630 is the RRC layer apparatus and processes the control message received from the BS to perform the required operations. For example, when receiving an RRC CONNECTION SETUP message, the control message processor 1630 sets up the temporary DRB with the SRB.

The higher layer processors 1620 and 1625 mean the DRB apparatus and may be configured for each service. The higher layer processors 1620 and 1625 process data generated from user services such as a file transfer protocol (FTP) or a voice over internet protocol (VoIP) and transfer the processed data to the multiplexer and demultiplexer 1615 or process the data transferred from the multiplexer and demultiplexer 1615 and transfer the processed data to service application of the higher layer. One service may be mapped one-to-one with one EPS bearer and one higher layer processor on a one-to-one basis.

The controller 1610 confirms scheduling commands, for example, reverse grants controls received through the transceiver 1605 to control the multiplexer and demultiplexer 1615 to perform the reverse transmission to an appropriate transmission resource at an appropriate time. Meanwhile, the controller 1610 may control the UE 310 to perform any one operation of the above-described embodiments. For example, the controller 1610 may receive, from the BS, a first message including at least one of first information on whether first signaling optimization is allowed for the UE or second information on whether second signaling optimization is allowed for the UE, transmit, to the BS, a second message including at least one of third information on whether the UE supports the first signaling optimization or fourth information on whether the UE supports the second signaling optimization, and receive, from the BS, a third message including fifth information on the signaling optimization supported by the UE.

Meanwhile, the controller 1610 and the transceiver 1605 are not necessarily implemented as a separate apparatus but may be implemented as one component unit in a form like a single chip. Further, the controller 1610 and the transceiver 1605 may be electrically connected to each other.

In addition, for convenience of explanation, the controller 1610, the multiplexer and demultiplexer 1615, the control message processor 1630, various higher layer processors 1620 and 1625, the EPS bearer manager 1635, the NAS layer apparatus 1640, and the like may be represented as separate components, but may be implemented as a single component unit in the form like a single chip. The controller 1610, the multiplexer and demultiplexer 1615, the control message processor 1630, various higher layer processors 1620 and 1625, the EPS bearer manager 1635, the NAS layer apparatus 1640, and the like need not to be implemented as the separate apparatus but in one component unit, for example, the controller 1610, the operations of the controller 1610, the multiplexer and demultiplexer 1615, the control message processor 1630, various higher layer processors 1620 and 1625, the EPS bearer manager 1635, and the NAS layer apparatus 1640 as described above may be performed.

Further, for example, the controller 1610 may be a circuit, an application-specific circuit, or at least one processor. In addition, the operations of the UE 310 may be realized by including a memory device storing the corresponding program code in any component unit of the UE. That is, the controller 1610 can execute the above-described operations by reading and executing the program code stored in the memory device by a processor or a CPU.

Figure 17:
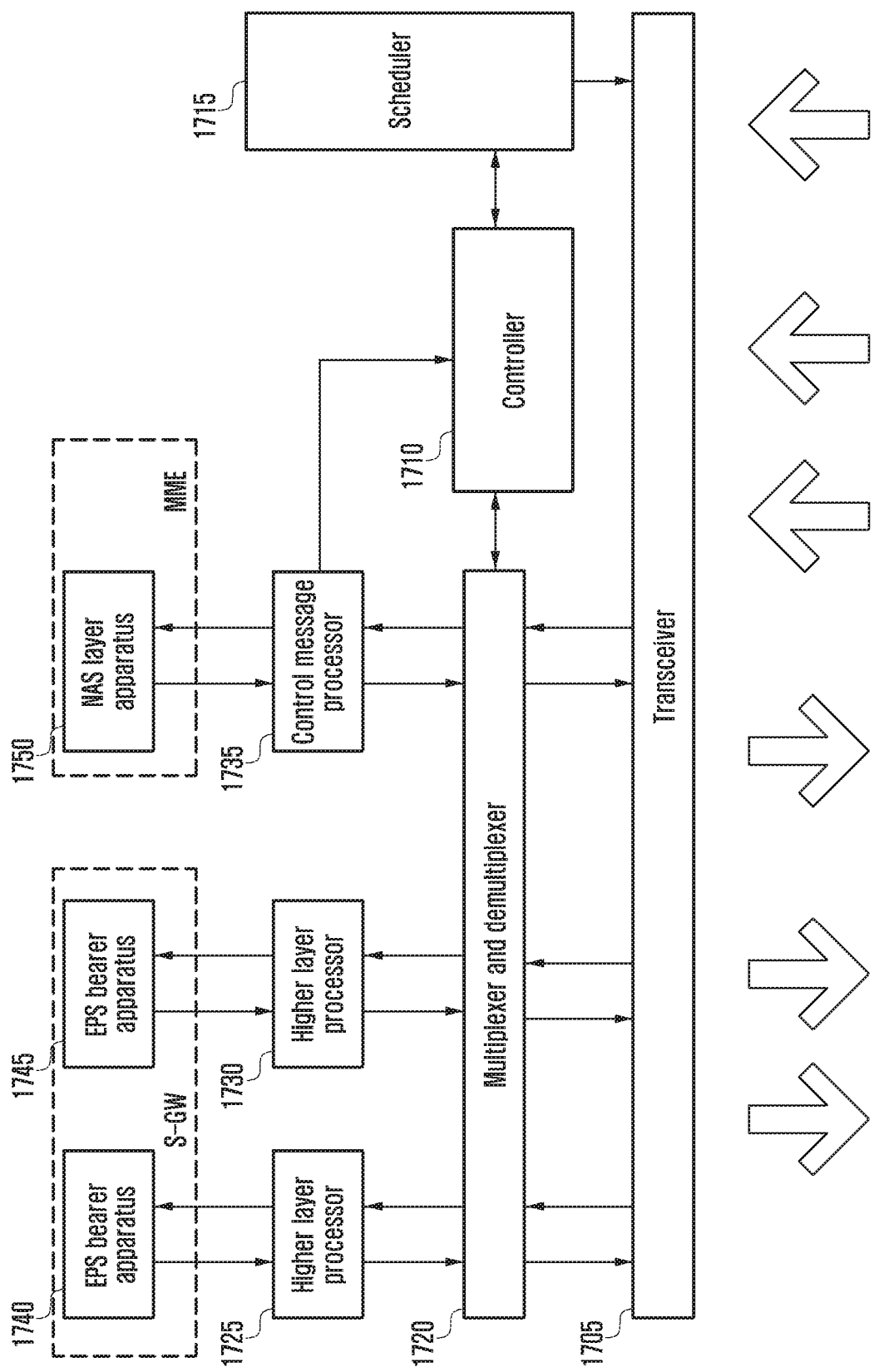
FIG. 17 is a block configuration diagram of a base station according to an embodiment of the present disclosure.

FIG. 17 is a block configuration diagram of a BS according to an embodiment of the present disclosure.

FIG. 17 is a block diagram illustrating a configuration of the BS 320 according to the embodiment of the present disclosure, in which the BS 320 of FIG. 17 includes a transceiver 1705, a controller 1710, a multiplexer and demultiplexer 1720, a control message processor 1735, various higher layer processors 1725 and 1730, a scheduler 1715, EPS bearer apparatuses 1740 and 1745, a NAS layer apparatus 1750, and the like. Meanwhile, the configuration of FIG. 17 may be the configuration of the MME 330 and the S-GW 340 and the EPS bearer apparatuses 1740 and 1745 may be located at the S-GW 340 and the NAS layer apparatus 1750 may be located at the MME 330.

The transceiver 1705 transmits data and a predetermined control signal through a forward carrier and receives the data and the predetermined control signal through a reverse carrier. When a plurality of carriers is configured, the transceiver 1705 transmits and receives the data and the control signal through the plurality of carriers.

The multiplexer and demultiplexer 1720 multiplexes data generated from the higher layer processors 1725 and 1730 or the control message processor 1735 or demultiplexes data received by the transceiver 1705 and serves to transmit the data or the control message to the appropriate higher layer processors 1725 and 1730 or the control message processor 1735 or the controller 1710. The control message processor 1735 processes the control message that the UE transmits to perform the required operation or generates the control message to be transmitted to the terminal and transmits the generated control message to the lower layer.

The higher layer processors 1725 and 1730 may be configured for each EPS bearer and configure data transferred from the EPS bearer apparatuses 1740 and 1745 as the RLC PDU and may transfer the data to the multiplexer and demultiplexer 1720 or configure RLC PDU transferred from the multiplexer and demultiplexer 1720 as the PDCP SDU and transfer the RLC PDU to the EPS bearer apparatus.

The scheduler 1715 allocates transmission resources to the UE 310 at an appropriate time in consideration of the buffer state and the channel state of the UE 310 and processes a signal that the UE 310 transmits to the transceiver 1705 or performs a process to transmit the signal to the UE.

The EPS bearer apparatuses 1740 and 1745 are configured for each EPS bearer and process the data transferred from the higher layer processors 1725 and 1730 and transfer the processed data to the next network node.

The higher layer processors 1725 and 1730 and the EPS bearer apparatuses 1740 and 1745 are connected to each other by an S1-U bearer. The higher layer processor corresponding to the common DRB is connected to the EPS bearer for the common DRB by a common S1-U bearer.

The NAS layer apparatus 1750 processes the IP packet included in the NAS message and transfers the processed IP packet to the S-GW 340.

The controller 1710 may control the BS 320 to perform any one operation of the above-described embodiments. For example, the controller 1710 may transmit, to the UE, a first message including at least one of first information on whether first signaling optimization is allowed for the UE or second information on whether second signaling optimization is allowed for the UE, transmit, to the UE, a second message including at least one of third information on whether the UE supports the first signaling optimization or fourth information on whether the UE supports the second signaling optimization, and transmit, to the UE, a third message including fifth information on the signaling optimization supported by the UE.

Meanwhile, the controller 1710 and the transceiver 1705 are not necessarily implemented as a separate apparatus but may be implemented as one component unit in a form like a single chip. Further, the controller 1710 and the transceiver 1705 may be electrically connected to each other.

In addition, for convenience of explanation, the controller 1710, the multiplexer and demultiplexer 1720, the control message processor 1735, various higher layer processors 1725 and 1730, the scheduler 1715, the EPS bearer apparatuses 1740 and 1745, the NAS layer apparatus 1750, and the like may be represented as separate components, but may be implemented as a single component unit in the form like the single chip. The controller 1710, the multiplexer and demultiplexer 1720, the control message processor 1735, various higher layer processors 1725 and 1730, the scheduler 1715, the EPS bearer apparatuses 1740 and 1745, the NAS layer apparatus 1750, and the like need not to be implemented as the separate apparatus but in one component unit, for example, the controller 1710, the operations of the multiplexer and demultiplexer 1720, the control message processor 1735, various higher layer processors 1725 and 1730, the scheduler 1715, the EPS bearer apparatuses 1740 and 1745, the NAS layer apparatus 1750 as described above may be performed.

Further, for example, the controller 1710 may be a circuit, an application-specific circuit, or at least one processor. In addition, the operations of the BS 320 may be realized by including a memory device storing the corresponding program code in any component unit of the UE. That is, the controller 1710 can execute the above-described operations by reading and executing the program code stored in the memory device by a processor or a CPU.

The operations of the BS or the terminal described above may be realized by including the memory device storing the corresponding program code in any component unit of the BS or the terminal apparatus. That is, the processor of the BS or the terminal apparatus may execute the above-described operations by reading and executing the program code stored in the memory device by a processor or a CPU.

Various components, modules, etc. of the entity, the BS, or the terminal apparatus described herein may also be operated using hardware circuits, for example, complementary metal oxide semiconductor (CMOS) based logic circuit, hardware circuits such as firmware, software, and/or a combination of the hardware and the firmware and/or software embedded in a machine-readable medium. For example, various electrical structures and methods may be performed using electrical circuits such as transistors, logic gates, and an ASIC.

While the present disclosure has been shown and described with reference to various embodiments thereof, it will be understood by those skilled in the art that various changes in form and details may be made therein without departing from the spirt and scope of the present disclosure as defined by the appended claims and their equivalents.

What is claimed is:

1. A method performed by a terminal in a wireless communication system, the method comprising:
   receiving, from a base station, a system information block including information indicating whether uplink data is allowed to be transmitted on a radio resource control (RRC) message;
   identifying that the uplink data to be transmitted occurs;
   in case that the information indicates that the uplink data is allowed to be transmitted on the RRC message and the terminal supports the transmitting the uplink data on the RRC message, transmitting, to the base station, a first message for indicating that the uplink data is to be transmitted on the RRC message; and
   transmitting, to the base station, the RRC message including the uplink data.

2. The method of claim 1, wherein the RRC message includes a non-access stratum (NAS) message, and the NAS message includes the uplink data.

3. The method of claim 1, further comprising:
   receiving, from the base station, a second message for releasing of a RRC connection, the second message including information for indicating to retain a terminal context; and
   retaining the terminal context based on the information indicating to retain the terminal context.

4. The method of claim 3, further comprising:
   transmitting, to the base station, a third message for reusing the retained terminal context;
   receiving, from the base station, a fourth message including at least one configuration information; and
   establishing the RRC connection based on the retained terminal context and the at least one configuration information.

5. A method performed by a base station in a wireless communication system, the method comprising:
   transmitting, to a terminal, a system information block including information indicating whether uplink data is allowed to be transmitted on a radio resource control (RRC) message;
   in case that the information indicates that the uplink data is allowed to be transmitted on the RRC message, receiving, from the terminal, a first message for indicating that the uplink data is to be transmitted on the RRC message; and
   receiving, from the terminal, the RRC message including the uplink data.

6. The method of claim 5, wherein the RRC message includes a non-access stratum (NAS) message, the NAS message includes the uplink data.

7. The method of claim 5, further comprising:
   transmitting, to a core network entity, the uplink data.

8. The method of claim 5, further comprising:
   transmitting, to the terminal, a second message for releasing of a RRC connection, the second message including information for indicating to retain a terminal context; and
   retaining the terminal context.

9. The method of claim 8, further comprising:
   receiving, from the terminal, a third message for reusing the retained terminal context,
   transmitting, to the terminal, a fourth message including at least one configuration information; and
   establishing the RRC connection based on the retained terminal context and the at least one configuration information.

10. A terminal in a wireless communication system, the terminal comprising:
    transceiver; and
    controller configured to:
      receive, from a base station via the transceiver, a system information block including information indicating whether uplink data is allowed to be transmitted on a radio resource control (RRC) message,
      identify that the uplink data to be transmitted occurs,
      in case that the information indicates that the uplink data is allowed to be transmitted on the RRC message and the terminal supports the transmitting the uplink data on the RRC message, transmit, to the base station via the transceiver, a first message for indicating that the uplink data is to be transmitted on the RRC message, and
      transmit, to the base station via the transceiver, the RRC message including the uplink data.

11. The terminal of claim 10, wherein the RRC message includes a non-access stratum (NAS) message, and the NAS message includes the uplink data.

12. The terminal of claim 10, wherein the controller is further configured to:
    receive, from the base station via the transceiver, a second message for releasing of a RRC connection, the second message including information for indicating to retain a terminal context, and
    retain the terminal context based on the information indicating to retain the terminal context.

13. The terminal of claim 12, wherein the controller is further configured to:
    transmit, to the base station via the transceiver, a third message for reusing the retained terminal context,
    receive, from the base station via the transceiver, a fourth message including at least one configuration information, and
    establish the RRC connection based on the retained terminal context and the at least one configuration information.

14. A base station in a wireless communication system, the base station comprising:
    a transceiver; and
    controller configured to:
      transmit, to a terminal via the transceiver, a system information block including information indicating whether uplink data is allowed to be transmitted on a radio resource control (RRC) message,
      in case that the information indicates that the uplink data is allowed to be transmitted on the RRC message, receive, from the terminal via the transceiver, a first message for indicating that the uplink data is to be transmitted on the RRC message, and receive, from the terminal via the transceiver, the RRC message including the uplink data.

15. The base station of claim 14, wherein the RRC message includes a non-access stratum (NAS) message, and the NAS message includes the uplink data.

16. The base station of claim 14, wherein the controller is further configured to:
   transmit, to a core network entity via the transceiver, the uplink data.

17. The base station of claim 14, wherein the controller is further configured to:
   transmit, to the terminal via the transceiver, a second message for releasing of a RRC connection, the second message including information for indicating to retain a terminal context, and
   retain the terminal context.

18. The base station of claim 17, wherein the controller is further configured to:
   receive, from the terminal via the transceiver, a third message for reusing the retained terminal context,
   transmit, to the terminal via the transceiver, a fourth message including at least one configuration information, and
   establish the RRC connection based on the retained terminal context and the at least one configuration information.

* * * * *